United States Patent
Yoshiura et al.

(10) Patent No.: US 8,587,247 B2
(45) Date of Patent: Nov. 19, 2013

(54) SYNCHRONOUS CONTROL APPARATUS

(75) Inventors: Yasufumi Yoshiura, Fukuoka (JP); Yasuhiko Kaku, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 333 days.

(21) Appl. No.: 13/005,119

(22) Filed: Jan. 12, 2011

(65) Prior Publication Data

US 2011/0169441 A1 Jul. 14, 2011

(30) Foreign Application Priority Data

Jan. 12, 2010 (JP) .............................. P. 2010-004380
Jul. 26, 2010 (JP) .............................. P. 2010-167089

(51) Int. Cl.
*G05B 11/32* (2006.01)
*G05B 19/19* (2006.01)

(52) U.S. Cl.
CPC ..................................... *G05B 19/19* (2013.01)
USPC ........... 318/625; 318/432; 318/437; 318/561; 318/608

(58) Field of Classification Search
CPC ..................................................... G05B 19/19
USPC ............................ 318/625, 608, 561, 437, 432
See application file for complete search history.

(56) References Cited

U.S. PATENT DOCUMENTS

| | | | |
|---|---|---|---|
| 5,546,826 A * | 8/1996 | Yanagisawa | 74/490.09 |
| 5,555,178 A * | 9/1996 | Hashimoto | 700/175 |
| 6,252,367 B1 * | 6/2001 | Sakamoto et al. | 318/560 |
| 6,384,561 B1 * | 5/2002 | Niizuma et al. | 318/625 |
| 6,809,493 B2 * | 10/2004 | Iwashita et al. | 318/625 |
| 7,274,968 B1 * | 9/2007 | Toyonaga | 700/169 |
| 2004/0180606 A1 | 9/2004 | Iwashita et al. | |
| 2007/0007926 A1 | 1/2007 | Iwashita et al. | |

FOREIGN PATENT DOCUMENTS

| | | |
|---|---|---|
| JP | 09-094735 | 4/1997 |
| JP | 2003-131712 | 5/2003 |
| JP | 2003-330510 | 11/2003 |
| JP | 2004-288164 | 10/2004 |
| JP | 2005-099981 | 4/2005 |

(Continued)

OTHER PUBLICATIONS

Japanese Office Action for corresponding JP Application No. 2011-191023, Nov. 22, 2012.

(Continued)

*Primary Examiner* — Bentsu Ro
*Assistant Examiner* — David Luo
(74) *Attorney, Agent, or Firm* — Ditthavong Mori & Steiner, P.C.

(57) ABSTRACT

A synchronous control apparatus to synchronously control a plurality of motors with respect to a control subject includes a command device and a plurality of motor control devices. The control subject includes the motors, a plurality of position detectors configured to detect a plurality of position information of the motors respectively, and at least one coupler connecting movable axes of the motors. The command device includes a first position controller which is configured to compute a work position based on the position information detected by the position detectors and which is configured to compute, based on a difference between a position command and the work position, a new position command. Each of the motor control devices includes a second position controller configured to compute commands to drive the plurality of motors based on a difference between the new position command and the position information.

10 Claims, 19 Drawing Sheets

(56) References Cited

FOREIGN PATENT DOCUMENTS

| | | |
|---|---|---|
| JP | 2007-042068 | 2/2007 |
| JP | 2007-213113 | 8/2007 |
| JP | 2008-199777 | 8/2008 |
| JP | 2010-130778 | 6/2010 |

OTHER PUBLICATIONS

Japanese Office Action for corresponding JP Application No. 2010-167089, Aug. 17, 2011.

Japanese Office Action for corresponding JP Application No. 2011-191023, May 21, 2013.

* cited by examiner

SYNCHRONOUS CONTROL APPARATUS

CROSS-REFERENCE TO RELATED APPLICATIONS

The present application claims priority under 35 U.S.C. §119 to Japanese Patent Application No. 2010-167089, filed Jul. 26, 2010 and Japanese Patent Application No. 2010-004380, filed Jan. 12, 2010. The contents of these applications are incorporated herein by reference in their entirety.

BACKGROUND OF THE INVENTION

1. Field of the Invention

The present invention relates to a synchronous control apparatus.

2. Discussion of the Background

For example, Japanese Patent Application Laid-Open No. 2004-288164 as a conventional technique describes a control apparatus which drives and controls a servo motor by a position controller which outputs a velocity command with a predetermined period based on a position deviation between a position command and a position feedback from a position detector, and by a velocity controller which outputs a torque command with a predetermined period based on the velocity command and a velocity feedback from a velocity detector, and the control apparatus includes a synchronous correction processor which controls in synchronization, two servo motors that drive the same control subject, and which reduces a force applied between the two servo motors based on a force applied between the two servo motors.

SUMMARY OF THE INVENTION

According to one aspect of the present invention, a synchronous control apparatus to synchronously control a plurality of motors with respect to a control subject includes a command device and a plurality of motor control devices. The control subject includes the plurality of motors, a plurality of position detectors, and at least one coupler. The plurality of position detectors is configured to detect a plurality of position information of the plurality of motors respectively. The at least one coupler connects movable axes of the plurality of motors. The command device includes a first position controller. The first position controller is configured to compute a work position based on the plurality of position information detected by the plurality of position detectors. The first position controller is configured to compute, based on a difference between a position command and the work position, a new position command. Each of the plurality of motor control devices includes a second position controller. The second position controller is configured to compute commands to drive the plurality of motors based on a difference between the new position command and the plurality of position information.

According to another aspect of the present invention, asynchronous control apparatus to synchronously control two motors with respect to a control subject includes a position measuring device, a command device, first and second motor control devices, and a third motor control device. The control subject is a gantry mechanism. The gantry mechanism includes the two motors, two position detectors, and a coupler. The two position detectors are configured to detect two position information of the two motors respectively. The coupler connects movable axes of the two motors. The position measuring device is configured to measure one of axis coordinate system positions of a work position which is expressed by an XY-axes coordinate system. The command device includes a first position controller. The first position controller is configured to compute, based on a difference between a position command and a work position information according to the one of axis coordinate system positions of the work position measured by the position measuring device, a new position command. Each of the first and second motor control devices includes a second position controller. The second position controller is configured to compute a command to drive the two motors based on a difference between the new position command and the two position information. The third motor control device has a same function as a function of the first or second motor control device. One of the axis coordinate system positions of the work position is input to the third motor control device. The third motor control device outputs the one of the axis coordinate system positions of the work position to the command device.

According to further aspect of the present invention, a synchronous control apparatus includes a first axis, a second axis, and a command device. The first axis to drive a control subject includes a plurality of first motors, a plurality of position detectors, and at least one machine coupler. The plurality of position detectors is configured to detect a plurality of position information of the plurality of first motors respectively. The at least one machine coupler connects movable axes of the plurality of first motors. The second axis to drive another control subject includes a second motor, a position detector, and a machine connector. The position detector is configured to detect position information of the second motor. The machine connector connects a movable axis of the second motor. The command device is configured to make the first axis and the second axis carry out an arc interpolation operation of an XY-axes coordinate system based on a position command. The first axis configures a position integration proportion and velocity proportion control system. The second axis configures a position proportion and velocity integration proportion control system. A first position proportion gain in the first axis is set such that the first position proportion gain matches with a reciprocal of velocity integration time in the second axis. A position integration time in the first axis is set such that the position integration time matches with a reciprocal of a second position proportion gain in the second axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
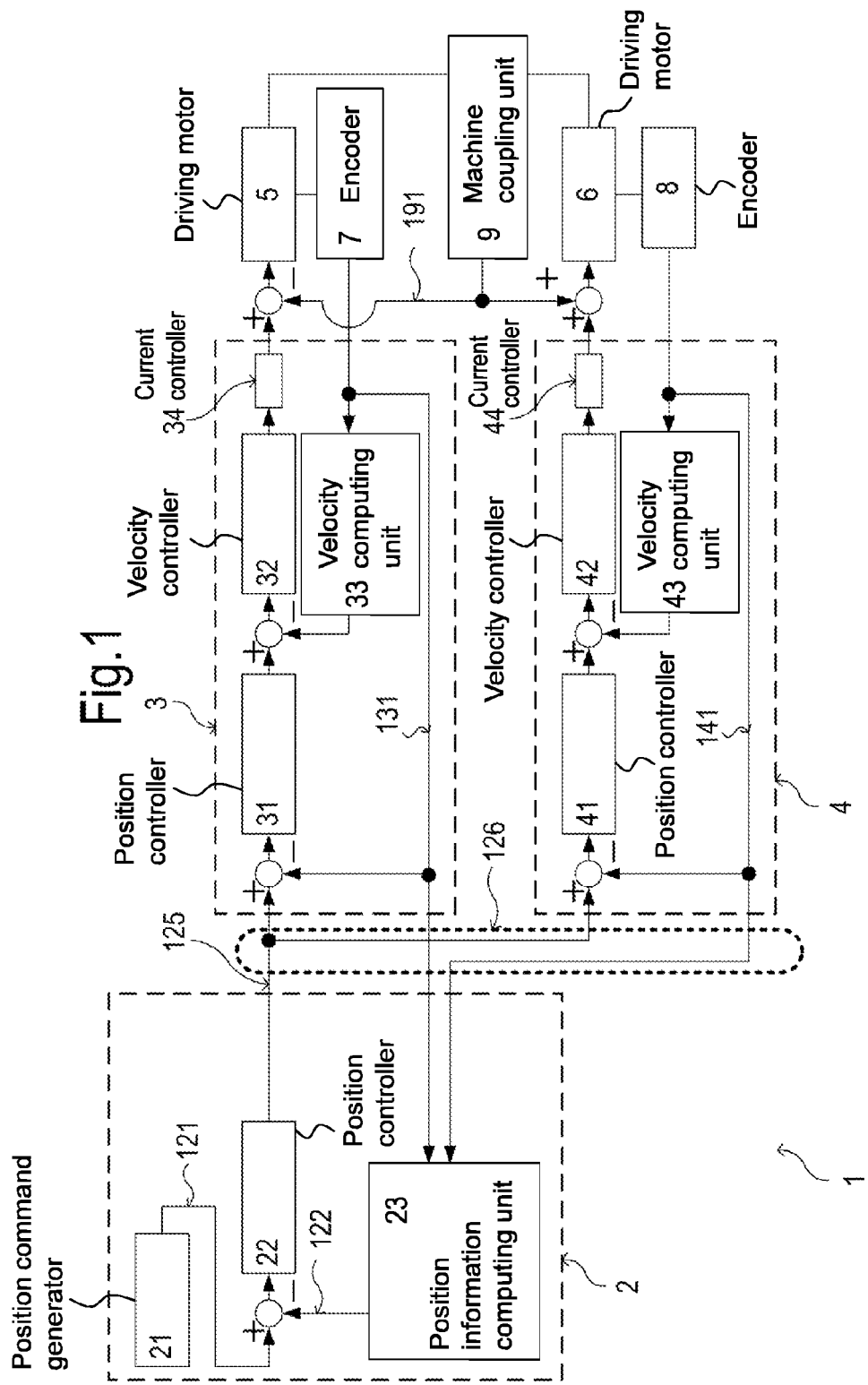
FIG. 1 is a block diagram of a synchronous control apparatus according to a first embodiment of the present invention.

The embodiments will now be described with reference to the accompanying drawings, wherein like reference numerals designate corresponding or identical elements throughout the various drawings.

A first embodiment of the present invention will be described with reference to the drawings. FIG. 1 is a block diagram of a synchronous control apparatus according to the first embodiment of the present invention. In FIG. 1, the synchronous control apparatus 1 includes a command device 2, and servo amplifiers 3 and 4.

The command device 2 includes a position command generator 21, a position controller 22 and a position information computing unit 23.

The position command generator 21 generates an internal position command 121 for driving motors 5 and 6, and outputs the internal position command 121 to the position controller 22. The position information computing unit 23 inputs detection position information 131 and 141 detected by encoders 7 and 8 through a position information transmission path 126 from the servo amplifiers 3 and 4, and outputs work position information 122 by later-described computation. The position controller 22 inputs a deviation between the internal position command 121 and the work position information 122, computes to perform proportion integration control, and outputs a new position command signal 125 to the servo amplifiers 3 and 4 through the position information transmission path 126. The position information transmission path 126 is, for example, a high-velocity serial communication path, and position information can be transmitted between the servo amplifiers 3 and 4 in synchronization with each other.

When a mechanism system driven by the synchronous control apparatus 1 is an XY-axes coordinate system and the internal position command 121 is a position command on the XY-axes coordinate system, the work position information 122 is a coordinate of a work position (operation center) existing on the XY-axes coordinate system.

The servo amplifier 3 includes a position controller 31, a velocity controller 32, a velocity computing unit 33, and a current controller 34. The servo amplifier 4 also has the same configuration (a position controller 41, a velocity controller 42, a velocity computing unit 43 and a current controller 44).

The position controllers 31 and 41 input deviations between the new position command signal 125 and the detection position information 131 and 141, and compute to perform proportion control, and output a velocity command. The velocity computing units 33 and 34 input detection position information 131 and 141, compute differentiation, and output a velocity feedback signal. The velocity controllers 32 and 42 input a deviation between a velocity command and a velocity feedback signal, and compute to perform proportion control, and output a command for driving the motor.

Since the command for driving the motor drives the motor by applying voltage to a motor winding to flow current, this command is a voltage or current command. The current controllers 34 and 44 compute to control current corresponding to the current command, and supply the current to the motors 5 and 6. The motors 5 and 6 generate a force which is in proportion to the supplied current. For example, if the motor is a synchronous rotation motor, a torque is generated, and if the motor is a linear motor, a thrust force is generated.

As described above, in addition to position control systems formed in the servo amplifiers 3 and 4, the synchronous control apparatus of the first embodiment of the present invention also includes another position control system in the command device 2. Since the position controller 22 in the command device 2 includes integration computation, it is possible to carry out a following operation or a positioning operation with respect to the internal position command 121 which is output from the position command generator 21 without positional deviation of the work position information 122. The position controller 22 can carry out the same operation even with integration control only.

Figure 2:
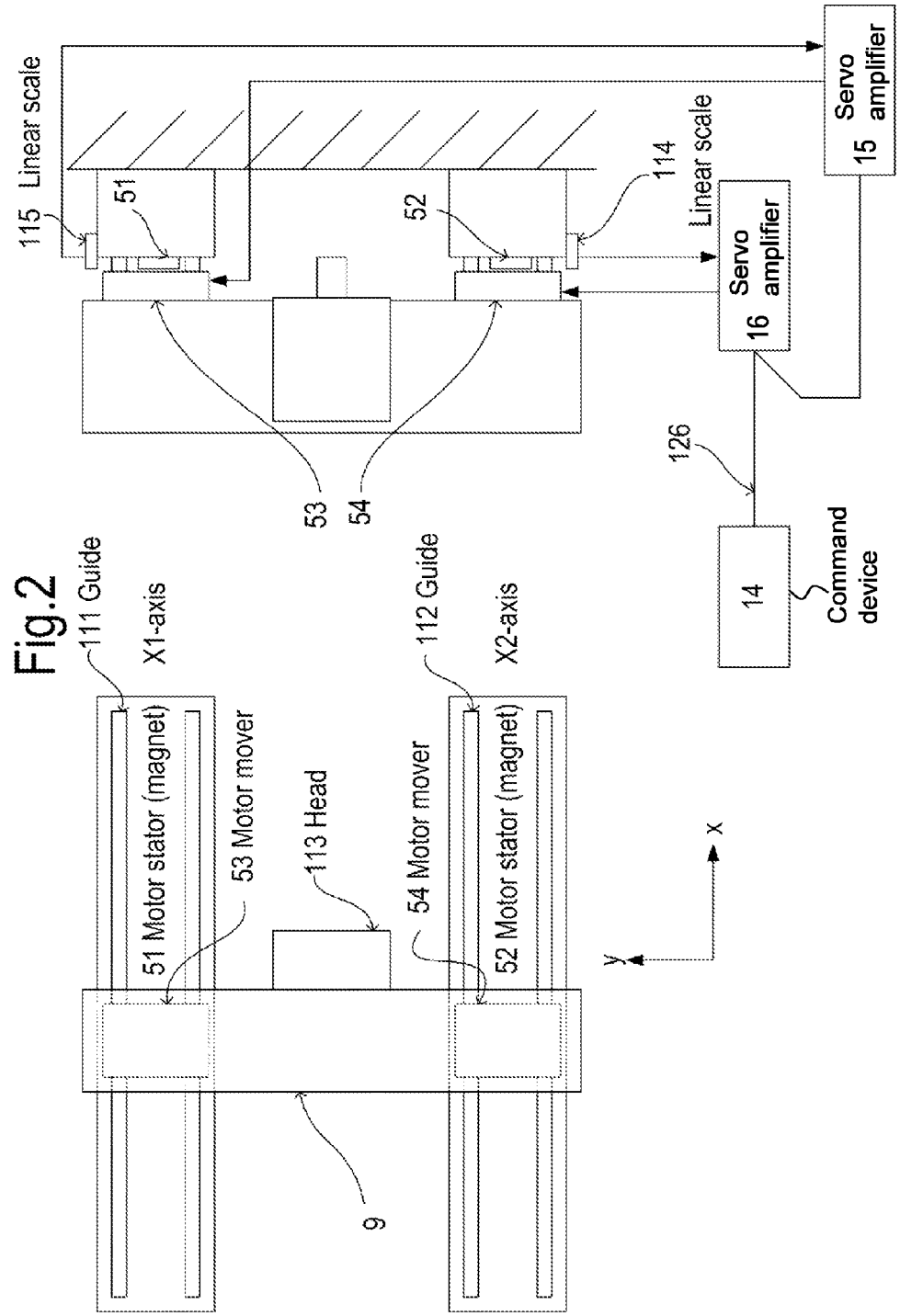
FIG. 2 is a diagram showing a first synchronous mechanism (gantry structure) which is driven by the synchronous control apparatus according to the embodiment of the present invention.

FIG. 2 is a diagram showing a first synchronous mechanism (gantry structure) which is driven by the synchronous control apparatus according to the first embodiment of the present invention. The first synchronous mechanism (gantry structure) is used for a mounter for mounting a semiconductor component on a substrate, a bonding machine for welding a semiconductor component to a substrate, an industrial machine such as an applying apparatus, and a semiconductor device or a liquid crystal producing apparatus, for example. The first synchronous mechanism includes guides 111 and 112, a head 113, linear scales 114 and 115, motor stators 51 and 52, and motor movers 53 and 54.

When the first synchronous mechanism (gantry structure) is driven, a command device 14 sends the same position command to the servo amplifiers 15 and 16 which are the same position control configurations through a position information transmission path 126, and controls two axes (X1 axis and X2 axis) in synchronization.

Configurations of the motors 5 and 6, the encoders 7 and 8 and a machine coupling unit 9 shown in FIG. 1 briefly express a configuration of the first synchronous mechanism (gantry structure) shown in FIG. 2. A disturbance torque (reaction force) 191 in FIG. 1 means an invalid reaction force, and this invalid reaction force corresponds to a negative thrust force with respect to the servo amplifier 3, and corresponds to a positive thrust force with respect to the servo amplifier 4. The command device 2 and the servo amplifiers 3 and 4 in FIG. 1 correspond to the command device 14 and the servo amplifiers 15 and 16 in FIG. 2.

Problems generated when the first synchronous mechanism (gantry structure) is controlled in synchronization will be discussed below.

In the first synchronous mechanism (gantry structure) which fastens mutual axes by the machine coupling unit 9, the higher the rigidity of the machine coupling unit 9 is, the greater the twisting reaction force (invalid reaction force, hereinafter) applied from one of the axes to the other axis and from the other axis to one axis becomes. This invalid reaction force is caused by producing variation of a linear scales 114 and 115, a mounting error with respect to a mechanism, or assembling precision of the mechanism itself, and this exerts influence on both the position control systems as disturbance with respect to the servo amplifiers 15 and 16.

That is, the invalid reaction force becomes a thrust force having a symbol opposite from thrust force command values of the servo amplifiers 15 and 16. In the servo amplifiers 15 and 16, to cancel the invalid reaction force, it is necessary to further increase the thrust force command value (to increase a load ratio) and therefore, energy efficiency is largely deteriorated.

When the invalid reaction force is large, there is an adverse possibility that the invalid reaction force exceeds a thrust force upper limit value that the servo amplifiers 15 and 16 can output. If the invalid reaction force exceeds the thrust force upper limit value, normal position control operation or normal synchronous control cannot be carried out.

In N-axes synchronous control (N is the number of axes and N is a natural number greater than 1), one detection position is defined as a master position and positions of remaining axes (N−1) are defined as slave positions in some cases. For example, in FIG. 2, a detection position of the X1-axis is a master position, and a detection position of the X2-axis is a slave position. In the case of the synchronous mechanism (gantry structure) as shown in FIG. 2, a Y-axis which intersects with the X1-axis and the X2-axis exists, and the work position (operation center) exists on the XY-axes coordinate system in many cases. The Y-axis coordinates move between the X1-axis and the X2-axis, the work position does not always exist on the master position (on X1-axis), and synchronous control with respect to the work position cannot be carried out.

Next, a method in which the position information computing unit 23 computes the work position information 122 from the detection position information 131 and 141 will be described.

The position information computing unit 23 computes X-coordinates of the work position information 122 using the following equation (1). Here, m is in a range of 0≤m≤1, and m is determined from a work position which is previously designated freely (calculation method of m will be described later).

$$(X\text{-coordinates of work position information } 122)=m\times\\(\text{detection position information } 131)+(1-m)\times\\(\text{detection position information } 141) \quad (1)$$

In the configuration of the first synchronous mechanism (gantry structure) shown in FIG. 2, when there is a work position at an arbitrary position between the X1-axis and the X2-axis, from the equation (1), the work position information 122 at an arbitrary position between a position of the X1-axis (detection position information 131) and a position of the X2-axis (detection position information 141) can be computed as X-coordinates, and a position where the encoder is not mounted can follow the position command or can be positioned.

For example, if m in the equation (1) is 0.5, a central position between the X1-axis and the X2-axis can be computed as X-coordinates of the work position information 122. In this manner, if a distance between the X1-axis and the X2-axis is defined as L, work position information in an X-axis direction of mL can be computed.

In the case of the configuration of the first synchronous mechanism (gantry structure) shown in FIG. 2, there are many industrial machines, semiconductor devices or liquid crystal producing apparatuses which configure the Y-axis intersecting with the X1-axis and the X2-axis, and an operation such as a machining operation of an article is carried out at a position determined by coordinates of X1-axis, X2-axis and Y-axis, i.e., at a work position.

Like the X1-axis and the X2-axis, the Y-axis also includes another servo amplifier (for Y-axis), configures a position control system, and drives another motor (for Y-axis) based on another position command (for Y-axis) from the command device 2. In this case, as will be described later, a value of m can be calculated based on Y-axis coordinates which intersect with the coordinates of the X1-axis and the X2-axis. That is, a position of the Y-axis is Y-coordinate of the work position information 122, and a position calculated by the equation (1) using m is X-coordinate of the work position information 122.

Figure 3:
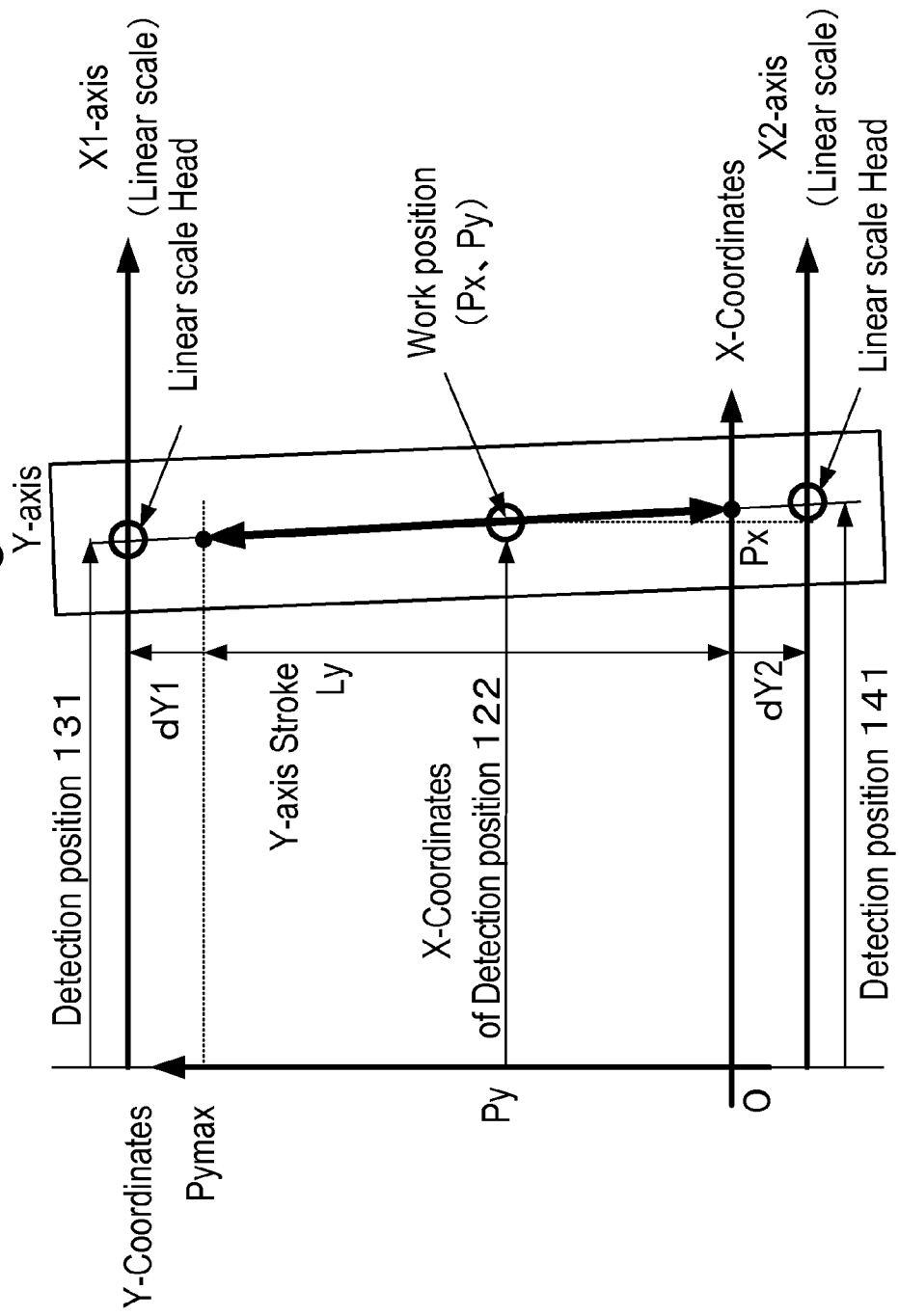
FIG. 3 is a schematic diagram showing the first synchronous mechanism (gantry structure) shown in FIG. 2.

A calculation expression of m will be described below. FIG. 3 is a schematic diagram showing the first synchronous mechanism (gantry structure) shown in FIG. 2. In FIG. 3, both the X1-axis and the X2-axis are positions of linear scales, and liner scale heads are located on detection positions 131 and 141. The Y-axis is a stroke Ly. An offset distance from a stroke end of the Y-axis to the linear scale head of the X1-axis is defined as dY1, and an offset distance from the origin (0 position) of the Y-axis to the linear scale head of the X2-axis is defined as dY2. The origin (0 position) of the Y-axis is set on an origin (0 position) of the Y-coordinates (work coordinates), origins (0 positions) of the X1-axis and the X2-axis are set at an origin (0 position) of the X-coordinates (work coordinates), and a work position is defined as (Px, Py).

In this case, m can be calculated using the following equation (2).

$$m=(Py+dY2)/(dY1+Ly+dY2) \quad (2)$$

In FIG. 3, inclination of the Y-axis is exaggerated, but in an actual machine, since a difference between the detection position information 131 and the detection position information 141 is about several tens μm with respect to Y-axis stroke of about 1 m, the inclination of the Y-axis is extremely small. It is possible to think, in terms of calculation, that the Y-axis direction is substantially in parallel to the Y-coordinates (work coordinates), if m in the equation (2) is applied to the equation (1), X-coordinate (Px) of the detection position 122 can be computed.

In this manner, the work position information in the X-axis direction can be calculated from a position of the Y-axis. When an operation head 113 which moves in the Y-axis is mounted on the machine coupling unit 9 shown in FIG. 2, if the machine coupling unit 9 between the X1-axis and the X2-axis is distorted, there is a problem that a mechanical error is generated in an X-coordinate position of the operation head 113 with respect to a position command depending upon a position of the operation head 113 in the Y-axis. However, according to the computation of the position information computing unit 23, even if the Y-axis is moved, it is possible to determine a position of the operation head 113 in the X-axis in accordance with the position command.

Figure 4:
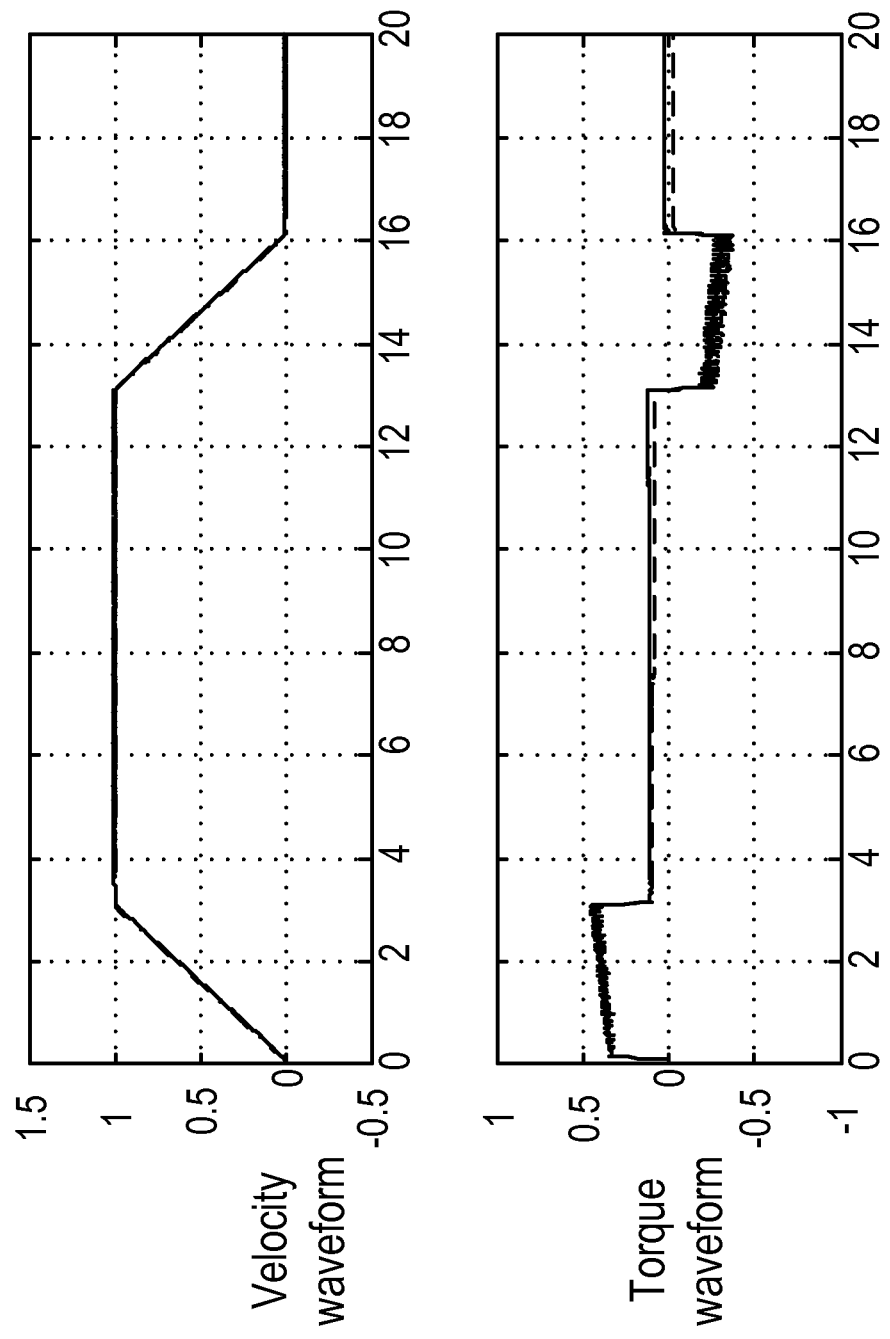
FIG. 4 is a diagram showing simulation waveforms of velocity and torque in the first embodiment.

FIG. 4 is a diagram showing simulation waveforms of velocity and torque in the first embodiment. In FIG. 4, the work position information 122 in FIG. 1 is equal to the detection position information 131, the upper waveform is a velocity waveform, the lower waveform is a torque waveform, vertical axes show amplitude, and horizontal axes are time axes. In this case, a thrust force corresponding to an invalid reaction force at the time of stop (after time axis 16) after the positioning operation is about 0.05 [p-p], and is about 10% of the maximum thrust force amplitude (about 0.5) at the time of acceleration and deceleration (3 from time axis 0).

The synchronous control apparatus of this embodiment of the present invention is achieved by paying attention to a fact that in the N-axes synchronous control (N is the number of axes and N is a natural number greater than 1), the same number of encoder positions as that of the axes and a machine position of the actual synchronous mechanism do not strictly match with each other, a fact that an invalid reaction force is generated by rigidity of a coupling member which fastens movable axes of the same number of motors as that of the axes to each other, and a fact that an invalid reaction force and a deviation between the axes of the same number of encoder positions as that of the axes are mutually contradictory.

That is, the synchronous control apparatus of this embodiment of the present invention is configured based on a fact that in the N-axes synchronous control (N is the number of axes and N is a natural number greater than 1), the number of detection positions which match with the position command should not be two or more, but one, and a fact that a position control system should be provided for each of the servo amplifiers, and the position control system using one detection position for the position command is required.

The representative invention of the present application includes a configuration that in the N-axes synchronous control (N is the number of axes and N is a natural number greater than 1), a work position is calculated from a plurality of encoder positions, and the work position is made to follow a position command, a configuration that integration computation in each servo amplifier is eliminated (In the integration computation, as the motion becomes lower frequency, the gain is increased. Therefore, at the time of stop when the positioning operation is completed, an invalid reaction force is increased. The increase in the invalid reaction force is suppressed by eliminating the integration computation), and a configuration that one new position control system is added to an outer side of the servo amplifier, and only this position control system is provided with the integration computation.

As described above, in the representative invention of the present application, precision of a machine which is a control subject is also comprehensively and essentially considered. It is possible to suppress an invalid reaction force which is applied between axes using a general electric part (a motor, a servo amplifier or a command device) with respect to a machine which drives coordinate axes in the same direction of a plurality of motors, and it is possible to precisely perform synchronous control with respect to the work position.

That is, thrust forces (torques) of a plurality of motors which should operate in synchronization with each other can be made substantially equal to each other, and it is possible to realize the synchronization operation having a small invalid reaction force when the positioning operation is carried out or after the positioning operation is completed only by the position information transmission path through which position data is transmitted (utilizing general serial communication). Deviation caused by influence of rigidity or viscous friction of a machine coupling unit can be reduced, and work position information in the command device can strictly match with a position command when the positioning operation is completed.

In the representative invention of the present application, a transmission path other than the position information transmission path (for example, a position deviation transmission path or a torque command transmission path) is not required between axes of the servo amplifiers. Therefore, the servo amplifier can be formed from general products, and the servo amplifier is more excellent than a special product in terms of cost and maintenance.

The detection position information corresponds to position information described in claims, the internal position command corresponds to the position command described in claims, the work position information corresponds to the work position described in claims, the command device corresponds to a command apparatus, and the servo amplifier corresponds to a motor control apparatus described in claims.

Examples of applications of the synchronous control apparatus according to the embodiment of the present invention will be described in sequence with respect to various synchronous mechanisms.

Figure 5:
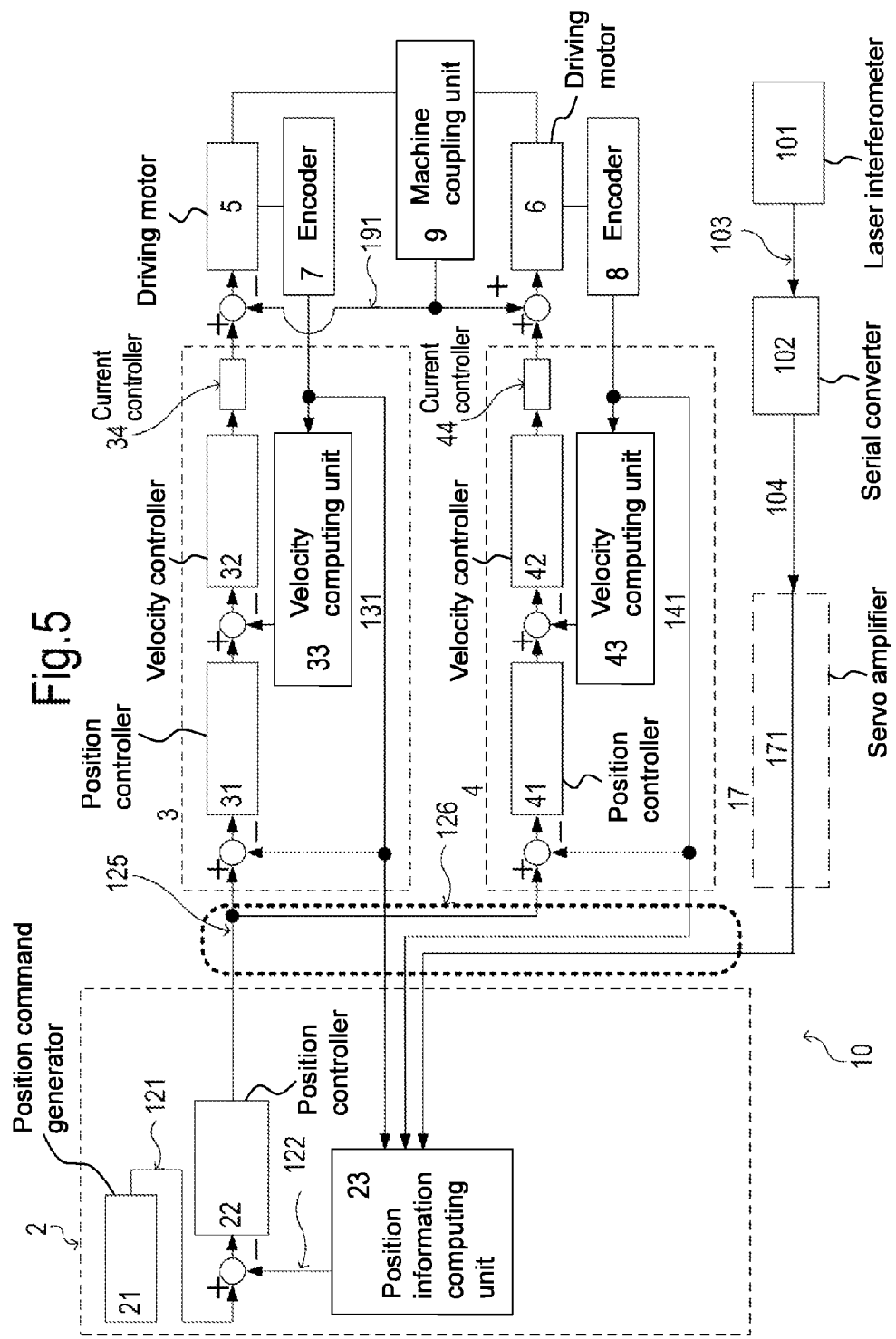
FIG. 5 is a block diagram of a synchronous control apparatus according to a second embodiment of the present invention.
Figure 6:
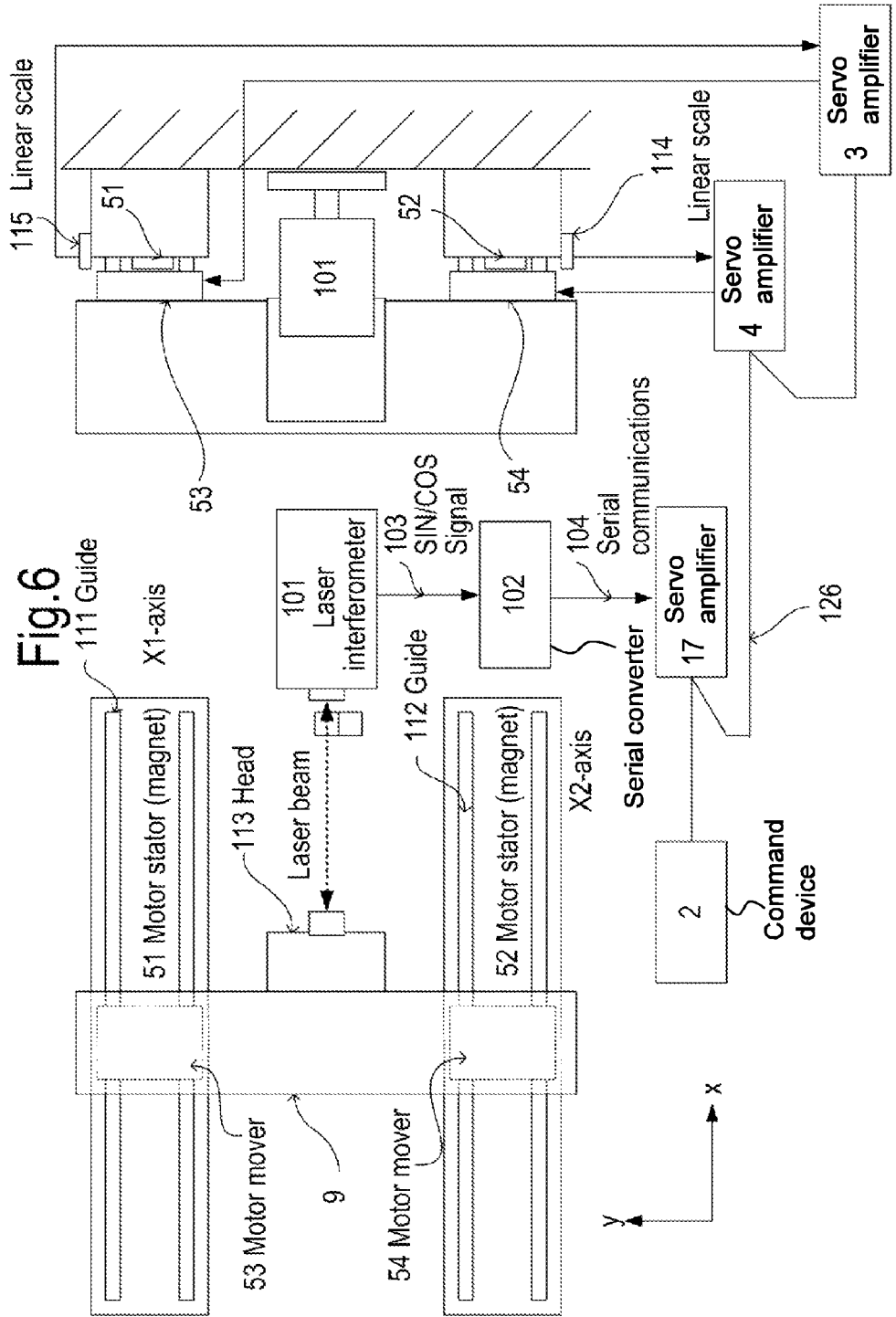
FIG. 6 is a diagram showing a second synchronous mechanism (another gantry structure) which is driven by the synchronous control apparatus of the embodiment of the present invention.

Next, a second embodiment of the present invention will be described with reference to the drawings. FIG. 5 is a block diagram of a synchronous control apparatus according to the second embodiment of the present invention. In FIG. 5, the synchronous control apparatus 10 includes a command device 2, and servo amplifiers 3, 4 and 17. FIG. 6 is a diagram showing a second synchronous mechanism (another gantry structure) which is driven by the synchronous control apparatus of the embodiment of the present invention. In FIG. 6, to precisely measure a position near a work position in the X direction, a position measuring apparatus using a laser interferometer 101 is mounted. In the laser interferometer 101, a reflection mirror is disposed on a machine coupling unit 9, and a position is measured in a non-contact manner by interference of laser beam from the laser interferometer. Therefore, the work position of the machine coupling unit 9 can directly be measured in the X-axis direction in a place where the linear scale 12 cannot be disposed. The laser interferometer 101 is configured to output the position measured by the laser interferometer 101 as a SIN/COS signal to a serial converter 102. The serial converter 102 is configured to convert the SIN/COS signal into a serial signal and configured to output the serial signal to a servo amplifier 17. Serial communications are performed between the serial converter 102 and the servo amplifier 17.

The second embodiment is different from the first embodiment in that the synchronous control apparatus 10 inputs detection position information of the laser interferometer 101 to the servo amplifier 17, inputs the same to the position information computing unit 23 in the command device 2 through a position information transmission path 126 as detection position information 171, and in that the position information computing unit 23 uses the detection position information 171 of only the laser interferometer 101, but does not use the detection position information 131 and the detection position information 141 from the servo amplifiers 3 and 4.

Therefore, in the synchronous control apparatus 10, a motor is not connected to the servo amplifier 17, and uses the servo amplifier 17 as a data converter which transmits only the detection position information 171 of the laser interferometer 101 to the position information transmission path 126. With this configuration, the synchronous control apparatus can be formed only from general products.

When detection resolving power of the encoders 7 and 8 (length per one pulse: e.g., 0.1 μm/1 pulse) and detection position resolving power of the laser interferometer 101 are different from each other, electronic gear computation is carried out in the position information computing unit 23 to equalize both the resolving powers.

In the second embodiment, a position near the work position is detected by the laser interferometer 101, this is feedback to the position control system in the command device 2 as the work position information 122 in the command device 2. Therefore, it is possible to make the work position in the X direction precisely follow the command position as compared with the first embodiment.

The laser interferometer corresponds to a position measuring apparatus described in claims.

Figure 7:
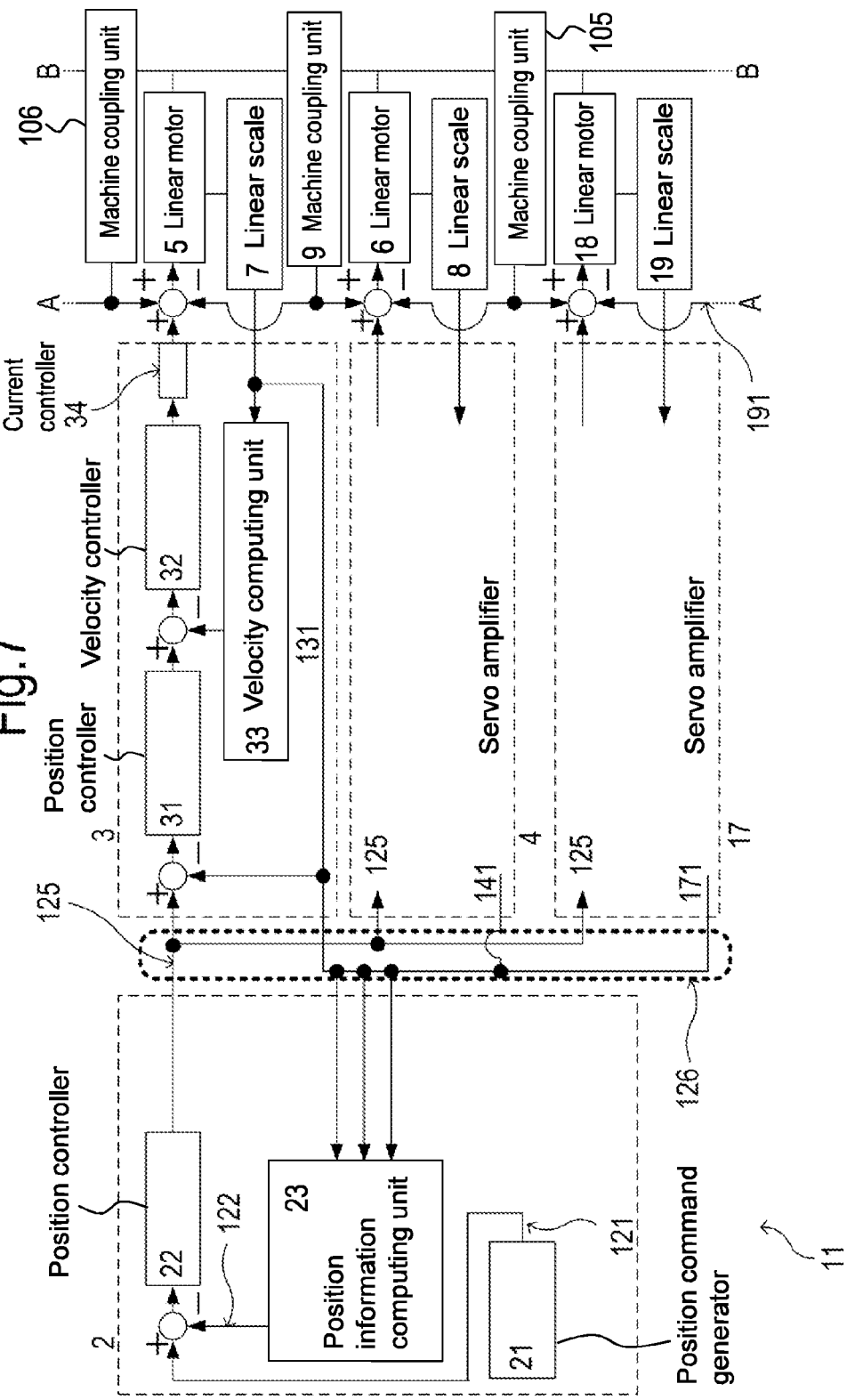
FIG. 7 is a block diagram of a synchronous control apparatus according to a third embodiment of the present invention.

Next, a third embodiment of the present invention will be described with reference to the drawings. FIG. 7 is a block diagram of a synchronous control apparatus according to the third embodiment of the present invention. In FIG. 7, the synchronous control apparatus 11 includes a command device 2, and servo amplifiers 3, 4 and 17. Since control configurations of the servo amplifiers 4 and 17 are the same as that of the servo amplifier 3, detailed description thereof is omitted.

Figure 8:
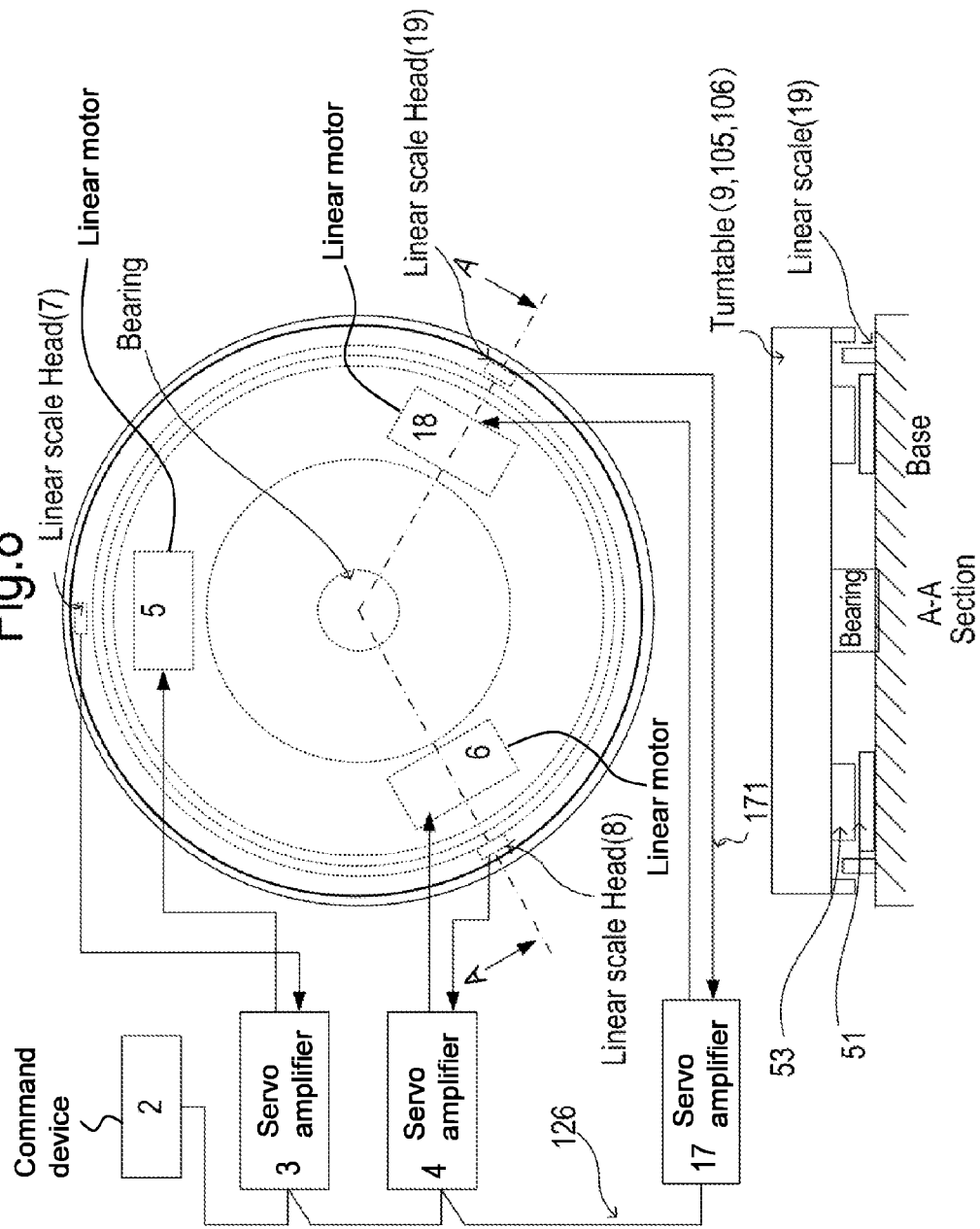
FIG. 8 is a diagram showing a third synchronous mechanism (arc linear) which is driven by the synchronous control apparatus of the embodiment of the present invention.

FIG. 8 is a diagram showing a third synchronous mechanism (arc linear) which is driven by the synchronous control apparatus of the embodiment of the present invention. The synchronous control apparatus of the third embodiment of the present invention supplies electricity to arc linear motors 5, 6 and 18 (each including the motor stator 51 and the motor mover 53) shown in FIG. 8, and synchronously controls a plurality of linear motor movable elements (e.g., linear motor mover 53). If position read heads of linear scales 7, 8, and 19 is mounted on each linear motor movable element and a tape-type linear scale is used, a scale can be pasted in a form of arc, a position of one linear scale may be detected using three heads, or a linear scale may be mounted on each head.

The third embodiment is different from the first embodiment in that the synchronous control apparatus 11 synchronously controls the synchronous mechanism including three axes (e.g., FIG. 8). Constituent elements having the same symbols as those of FIG. 1 which is a representative drawing of the first embodiment, have the same operation and effects and thus, detailed description thereof is omitted.

Configurations of the motors 5, 6 and 18, the encoders 7, 8 and 19 (corresponding to linear scale heads 7, 8, and 19 shown in FIG. 8, respectively), and the machine coupling units 9, 105 and 106 in FIG. 7 briefly express a configuration of the third synchronous mechanism (arc linear) described with reference to FIG. 8. Since the motors 5, 6 and 18 are mechanically coupled to each other through turntables (9, 105 and 106) in FIG. 8, the turntables (9, 105 and 106) are expressed by machine coupling units 9, 105 and 106 in FIG. 7. Like the first embodiment, since axes are mechanically coupled to each other through the machine coupling units 9, 105 and 106, and an invalid reaction force (disturbance torque 191) is applied to each axis.

The position information computing unit 23 in the command device 2 calculates the work position information 122 based on detection position information 131, 141 and 171 from the servo amplifiers 3, 4 and 17. For example, the calculation method of two axes using the equation (1) described in the first embodiment may be developed into three axes (see equations (3) and (4)).

In FIG. 8, an error of N-cycle (N is a natural number) is generated per one rotation due to a mounting error of the linear scale in some cases. For example, although the linear scale is pasted on a thin cylindrical member in FIG. 8, when the turntable is a large-scale arc turntable having a diameter of about 2 m, the cylindrical member is distorted in its radial direction due to a machining error or a mounting error in some cases. In this case, an error of N-cycle (N is a natural number) is generated in the turntable which is the mechanical coupling unit makes one rotation. Since this error is returned to its original state if the turntable makes one rotation, this error is an error of N-cycle.

When three linear scale heads are mounted on one linear scale to detect a position for example, if a true value of detection position information X1 detected from the linear scale through the servo amplifier 3 is defined as θ [rad] and a minute value corresponding to an error is defined as δ, and if it is assumed that an error of one cycle is generated in the linear scale, X1 becomes equal to $\theta+\delta \sin(\theta)$.

If liner scale heads are disposed on a circumference of the linear scale every 120° ($2\pi/3$), detection position information X2 of the servo amplifier 4 and detection position information X3 of the servo amplifier 17 are as follows: $X2=\theta+\delta \sin(\theta-2\pi/3)$ and $X3=\theta+\delta \sin(\theta-4\pi/3)$. Here, the three liner scale heads are deviated in position by 120° from each other, but since values of the true values θ become equal to each other if one original position is commonly used for the three motors, an error of one cycle depends on a physical position, and the values are deviated from θ by 120° and 240°.

The position information computing unit 23 in the synchronous control apparatus of the third embodiment of the present invention carries out averaging computation of the work position information 122 using the following equation (3).

$$\text{(work position information 122)} = ((\text{detection position information 131}) + (\text{detection position information 141}) + (\text{detection position information 171}))/3 \quad (3)$$

The equation (3) is expressed by the following equation (4).

$$\text{(work position information 122)} = \theta + \delta(\sin(\theta) + \sin(\theta - 2\pi/3) + \sin(\theta - 4\pi/3)) \quad (4)$$

Here, since $\sin(\theta)+\sin(\theta-2\pi/3)+\sin(\theta-4\pi/3)=0$, (work position information 122)=θ, and the work position information 122 is obtained as a true value having no error. When the number of arc linear motors is m, liner scale heads should be disposed every $360/m° = 2\pi/m$, and the position information computing unit 23 should carry out the averaging computation of the m number.

The synchronous control apparatus of the third embodiment of the present invention includes another position control system in the command device 2 in addition to the position control systems constituted in the servo amplifiers 3, 4 and 17. Since the position controller 22 in the command device 2 includes integration computation, the work position information 122 can carry out the following operation or the positioning operation without positional deviation with respect to the internal position command 121 which is output by the position command generator 21. It is possible to reduce an error of N-cycle (N is a natural number) per one rotation generated by a mounting error of the linear scale by the averaging computation of the position information computing unit 23.

Figure 9:
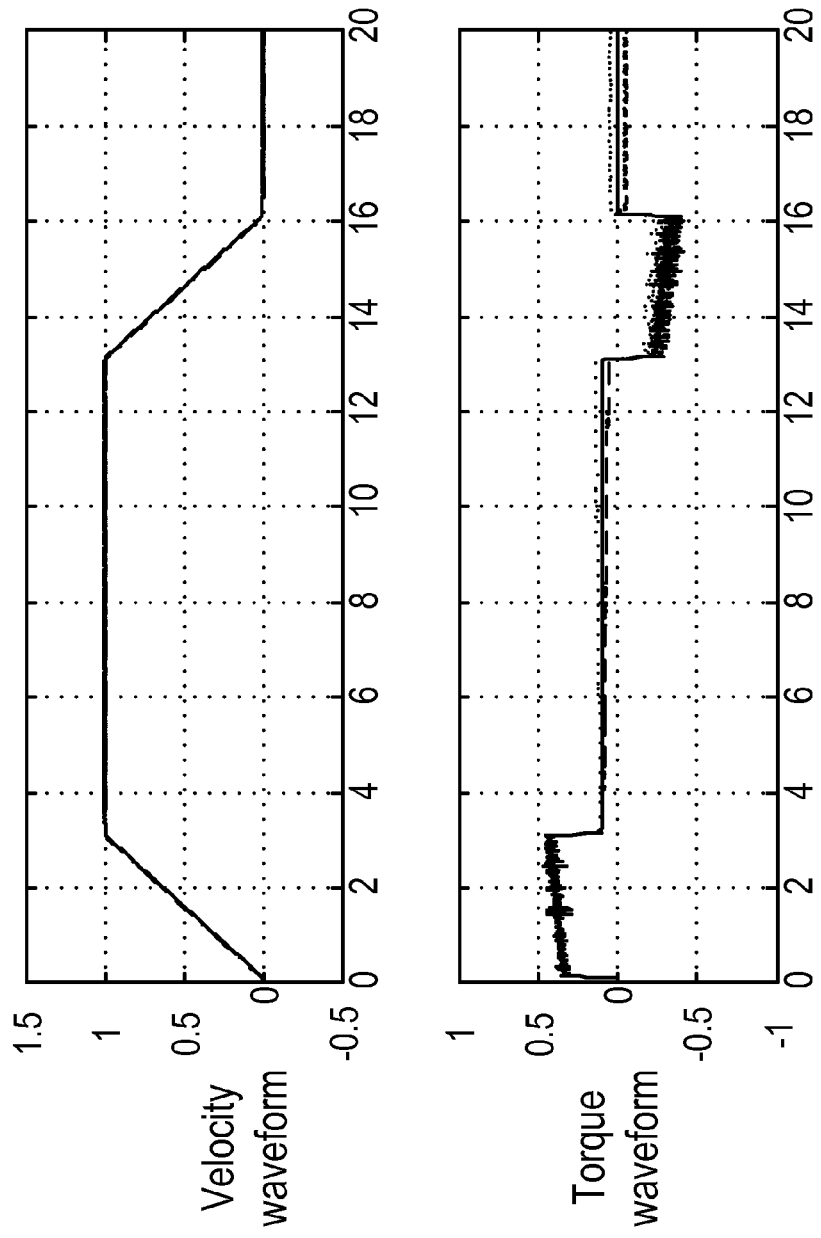
FIG. 9 is a diagram showing simulation waveforms of velocity and torque in the third embodiment.

FIG. 9 is a diagram showing simulation waveforms of velocity and torque in the third embodiment. In FIG. 9, the upper waveform is a velocity waveform, a lower waveform is a torque waveform, vertical axes show amplitude, and horizontal axes are time axes. In this case, a thrust force corresponding to an invalid reaction force at the time of stop (after time axis 16) after the positioning operation is about 0.1 [p-p], and is about 20% of the maximum thrust force amplitude (about 0.5) at the time of acceleration and deceleration (3 from time axis 0). It can be found that an invalid reaction force is small even in the case of three axes also.

As described above, according to the third embodiment, it is possible to easily increase the number of axes which synchronously control, and to suppress an invalid reaction force of each axis to a lower level. As the number of axes which synchronously control is increased, the control configuration between the axes becomes complicated, and adjustment of control gain is also complicated. According to the third embodiment, when a synchronous control system with respect to the N-axis (N is a natural number greater than 1) is configured, it is only necessary to prepare the same number of servo amplifiers (e.g., general servo amplifiers) having the same control system as that of the N-axes.

The synchronous control apparatus (the synchronous control apparatus of the first embodiment of the present invention when the number of axes is two) according to the third embodiment of the present invention which synchronously controls the N-axis can be applied to industrial machines such as a press machine and an injection molding machine.

In the case of the industrial machines such as the press machine and the injection molding machine of a mechanism in which two motors and one drive gear are coupled to each other, when the coupling is a rigid body, even if only a motor of one of the axes is controlled in position to make the other motor follow, encoder rotation angles of both the motors match with each other. Therefore, the synchronous control apparatus of the first or third embodiment of the present invention can be applied.

When this coupling rigidity is low, since a rotation angle of the drive gear and a rotation angle of the motor of two axes do not always match with each other, computation of the following equation (5) is carried out by the position information computing unit in the command device.

The rotation angle of the drive gear=a rotation angle of a motor of a first axis+(torsional moment/torsional rigidity×distance from an encoder of the first axis to the drive gear) (5)

In this manner, if the rotation angle of the drive gear is used as work position information, it is possible to make the rotation angle of the drive gear flow the command position and thus, the synchronous control apparatus of the first or third embodiment of the present invention can be applied.

The torsional moment is given by a torque of a motor of the first axis, and torsional rigidity is given by material and shape of the coupling. The distance from the encoder of the first axis to the drive gear is geometrically determined when the motor is assembled in the machine.

The synchronous control apparatus according to the third embodiment of the present invention which synchronously controls the N-axis (the synchronous control apparatus according to the first embodiment of the present invention when the number of axes is two) can be applied also to synchronous control of a wire saw sending-out axis and a wire saw take-up axis (an external sensor measures a sending-out amount from a reference position of a wire saw, and the measured value is defined as a feedback position to the command device), and also to synchronous control of a film sending-out axis and a film take-up axis (an external sensor measures a sending-out amount from a reference position of a film, and the measured value is defined as a feedback position to the command device).

The synchronous control apparatuses of the first to third embodiments of the present invention have the above-described configurations. Therefore, in the N-axis synchronous control (N is the number of axes, and is a natural number greater than 1), torques (thrust forces) of the axes at the time of acceleration and deceleration can be balanced (see FIGS. 4 and 9). Since the synchronous control apparatuses of the first to third embodiments of the present invention have the above-described configurations, the actual work position of the machine can be made to follow the position command.

Next, a fourth embodiment of the present invention will be described with reference to the drawings. In the synchronous control apparatus of the first embodiment of the present invention (FIG. 1), the velocity controllers 32 and 42 in the servo amplifiers 3 and 4 are only proportion control. Therefore, in some cases, the detection position information 131 and 132 of the servo amplifiers 3 and 4 may have differences with respect to a new position command signal 125 when the positioning operation is completed.

It is an object of the first embodiment of the present invention to position the work position information 122, i.e., to match the internal position command 121 and the work position information 122 with each other. Therefore, the difference between the detection position information 131 and 132 of the servo amplifiers 3 and 4 and the new position command signal 125 when the positioning operation is completed does not cause a problem. However, when the rigidity of the machine coupling unit 9 is low or viscous friction is high, this difference becomes large. In this case, if control systems of the velocity controllers 32 and 42 in the servo amplifiers 3 and 4 are changed to imperfect integration, this difference can be reduced.

Figure 10:
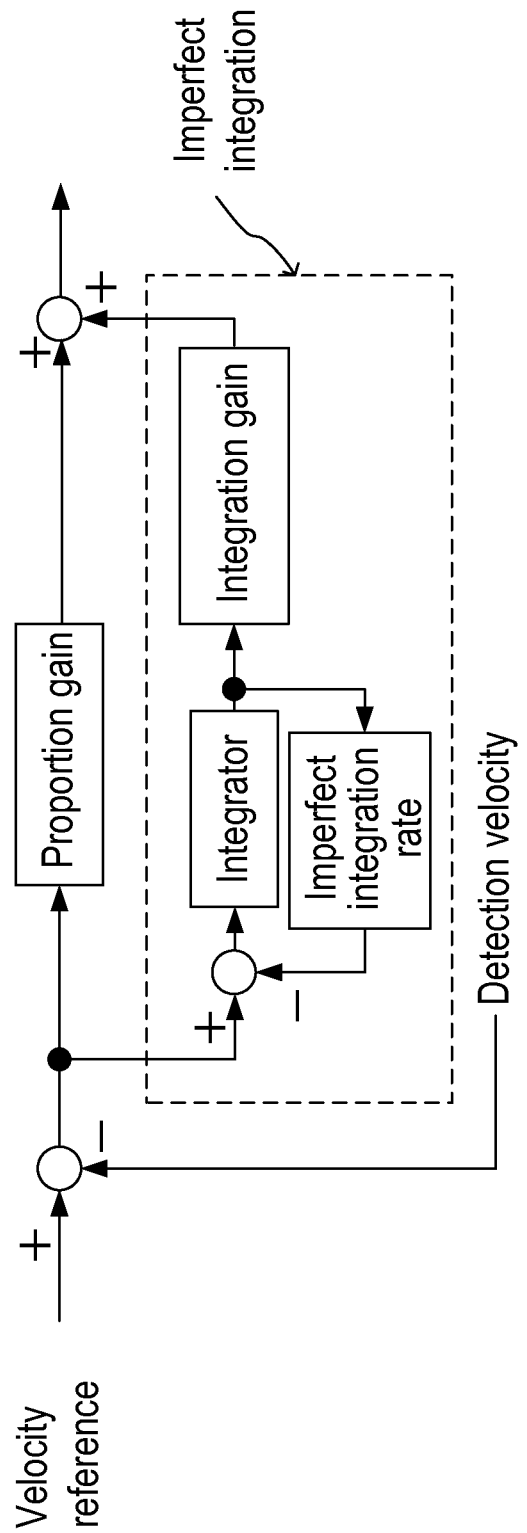
FIG. 10 is a block diagram of a velocity controller (proportion+imperfect integration) in a synchronous control apparatus according to a fourth embodiment of the present invention.

FIG. 10 is a block diagram of a velocity controller (proportion+imperfect integration) in a synchronous control apparatus according to the fourth embodiment of the present invention. In the synchronous control apparatus of according to the fourth embodiment of the present invention, the velocity controllers 32 and 42 in the servo amplifiers 3 and 4 of the synchronous control apparatus according to the first embodiment of the present invention are replaced by a velocity controller in FIG. 10.

In the case of the imperfect integration, if an imperfect integration ratio is increased, the control becomes close to proportion control, and if the imperfect integration ratio is reduced, the control becomes close to integration control. Therefore, when the machine rigidity is low, since a component of an invalid reaction force by motor torque or thrust force is small, an imperfect integration ratio should be adjusted to a small value within a permissible range (if the imperfect integration ratio is reduced, this difference becomes small, but the invalid reaction force is increased. If the imperfect integration ratio is increased, the difference becomes large, and the invalid reaction force is reduced).

In the synchronous control apparatuses of the first to fourth embodiments of the present invention, each of the command device and the servo amplifiers has the position control system, but even if the apparatus is integrally provided with the command device and the servo amplifiers, the same operation and effect can be obtained. The apparatus may input a position command which comes from outside, and may include two identical position control systems.

Next, a fifth embodiment of the present invention will be described with reference to the drawings. A machine tool having a gantry mechanism as shown in FIG. 2 can arc-interpolate the X-axis and the Y-axis to control a locus in addition to the single positioning operation in the X direction and Y direction. For example, if the X-axis shows sin waveform and the Y-axis shows the cosine waveform, the arc interpolation operation can be carried out.

The control systems of the synchronous control apparatuses used for the machine tools are position proportion and velocity integration proportion control systems in many cases. Here, since the Y-axis in FIG. 2 is a single axis drive, the control system should be position proportion and velocity integration proportion control, and since the X-axis is twin drive, the synchronous control apparatus shown in the block diagram in FIG. 1 should be applied as in the first embodiment of the present invention.

However, to keep balance of the control systems, in the X-axis of the twin drive, the position controller 22 in FIG. 1 inputs a deviation between the internal position command 121 and the work position information 122 to compute to perform integration control, and outputs a new position command signal 125 to the servo amplifiers 3 and 4 through the position information transmission path 126 to configure a position integration proportion and velocity proportion control system.

Figure 11:
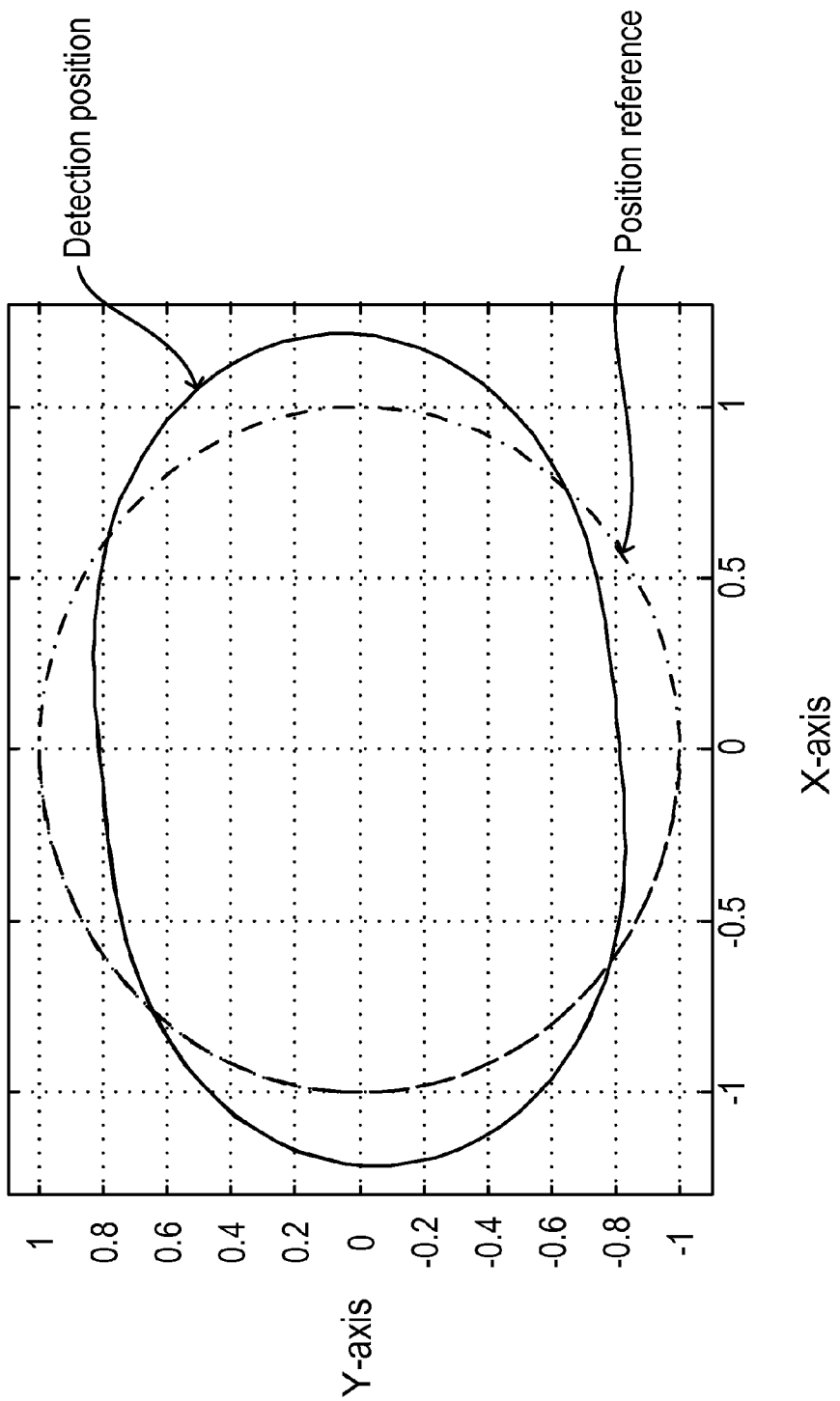
FIG. 11 is a diagram of waveform of an arc interpolation operation when a normal gain is set in a fifth embodiment of the present invention.
Figure 12:
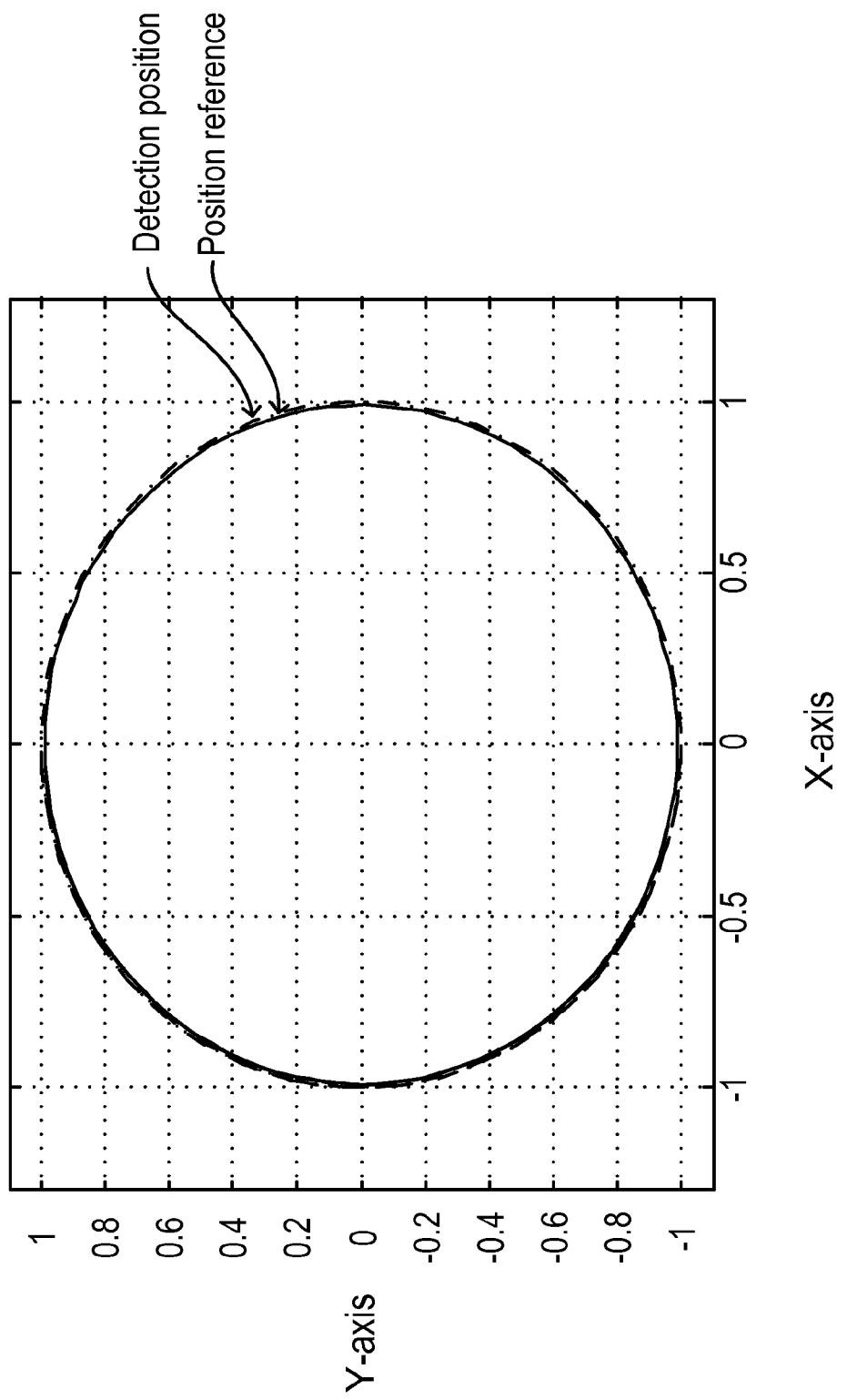
FIG. 12 is a diagram of waveform of the arc interpolation operation when a gain is set in the fifth embodiment of the present invention.

FIG. 11 is a diagram of waveform of an arc interpolation operation when a normal gain is set in the fifth embodiment of the present invention. FIG. 12 is a diagram of waveform of the arc interpolation operation when a gain is set in the fifth embodiment of the present invention. Each of the diagrams plots a position command and a detection position information when a position command of a sin function is input in the X-axis direction and a position command of a cos function is input in the Y-axis direction. The horizontal axis is the X-axis, the vertical axis is the Y-axis, the solid line shows detection position information, and the chain line shows a position command.

When an arc interpolation operation is carried out, if corresponding gain settings of control systems in the X-axis and the Y-axis are made equal to each other as usual, a locus is distorted as shown in FIG. 11, and the circle becomes an elliptic circle which is long in the X-axis direction. That is, the detection position information does not follow a position command.

To solve this problem, it is necessary to establish a gain setting equation. In the X-axis of the twin drive, if transfer functions from the position command of the position integration proportion and velocity proportion control system to the detection position information are put in order, it can be expressed as in the following equation (6).

$$\frac{K_{p1}K_v/T_{ir}}{s^3 + K_v s^2 + K_{p1}K_v s + K_{p1}K_v/T_{ir}} \tag{6}$$

In the Y-axis of the single axis drive, if transfer functions from the position command of the position proportion and velocity integration proportion control system to the detection position information are put in order, it can be expressed as in the following equation (7).

$$\frac{K_p K_v/T_i}{s^3 + K_v s^2 + (K_v/T_i)s + K_p K_v/T_i} \tag{7}$$

If the equations (6) and (7) match with each other, the detection position information matches with the position command in the arc interpolation operation. That is, the detection position information follows the position command. Especially, since a denominator of a transfer function called characteristic polynomial determines response characteristics of the transfer function, it is only necessary to determine a gain setting value such that coefficients in the denominators of the equations (6) and (7) match with each other, and to satisfy the following equations (8) and (9).

$$Kp1Kv=Kv/Ti \tag{8}$$

$$Kp1Kv/Tir=KpKv/Ti \tag{9}$$

That is, from the equation (8), the following equation (10) is established:

$$Kp1=1/Ti \tag{10}$$

the equation (10) is substituted into the equation (9) to establish $$Tir=1/Kp \tag{11}$$

At that time, numerators of the equations (6) and (7) match with each other.

When the gain setting values obtained from the equations (10) and (11) are used, it can be found from FIG. 12 that the distortion of the locus shown in FIG. 11 is improved, and the detection position information follows the position command.

Next, a sixth embodiment of the present invention will be described with reference to the drawings. In the fifth embodiment, the position controller 22 shown in FIG. 1 in the X-axis of the twin drive is the position integration proportion and velocity proportion control system, but even if the position controller 22 is a position proportion integration and velocity proportion control system, the same effect can be obtained. In this case, it is necessary to use gain setting equations which are different from the equations (10) and (11).

In the X-axis of the twin drive, if transfer functions from the position command of the position proportion integration and velocity proportion control system to the detection position information are put in order, it can be expressed as in the following equation (12).

$$\frac{K_{p1}K_v s + K_{p1}K_v/T_{ir}}{s^3 + K_v s^2 + 2K_{p1}K_v s + K_{p1}K_v/T_{ir}} \tag{12}$$

On the other hand, in the Y-axis of the single axis drive, if transfer functions from the position command of the position proportion and velocity proportion integration control system to the detection position information are put in order, it can be expressed as in the following equation (13).

$$\frac{K_p K_v s + K_p K_v/T_i}{s^3 + K_v s^2 + (K_v/T_i + K_p K_v)s + K_p K_v/T_i} \tag{13}$$

Here, if the equation (12) and the equation (13) match with each other, the detection position information matches with the position command in the arc interpolation operation. That is, the detection position information follows the position command. Especially, since a denominator of a transfer function called characteristic polynomial determines response characteristics of the transfer function, it is only necessary to determine a gain setting value such that coefficients in the denominators of the equations (12) and (13) match with each other, and to satisfy the following equations (14) and (15).

$$2Kp1Kv=Kv/Ti+KpKv \quad (14)$$

$$Kp1Kv/Tir=KpKv/Ti \quad (15)$$

That is, from the equation (14), the following equation (16) is established:

$$Kp1=1/(2Ti)+Kp/2 \quad (16)$$

the equation (16) is substituted into the equation (15) to establish $$Tir=1/(2Kp)+Ti/2 \quad (17).$$

However, unlike the fifth embodiment, only the equations (16) and (17) are satisfied, numerators in the equations (12) and (13) do not match with each other, and the detection position information does not completely match with the position commands of the X-axis and the Y-axis. To match the transfer functions including the numerators with each other, it is necessary to satisfy the following equation (18) in addition to the equations (16) and (17).

$$Ti=1/Kp \quad (18)$$

Figure 13:
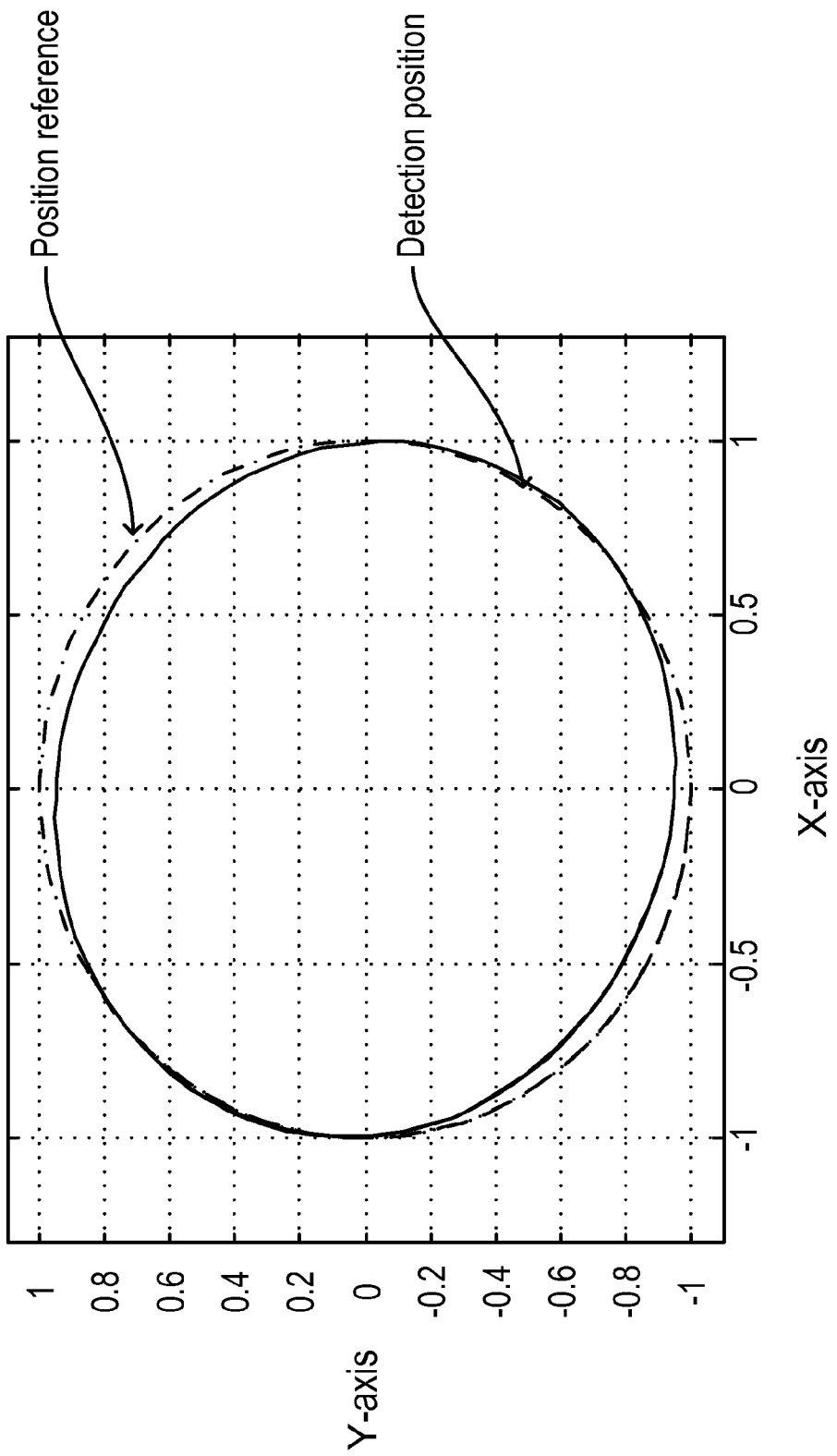
FIG. 13 is a diagram of waveform of an arc interpolation operation when a normal gain is set in a sixth embodiment of the present invention.
Figure 14:
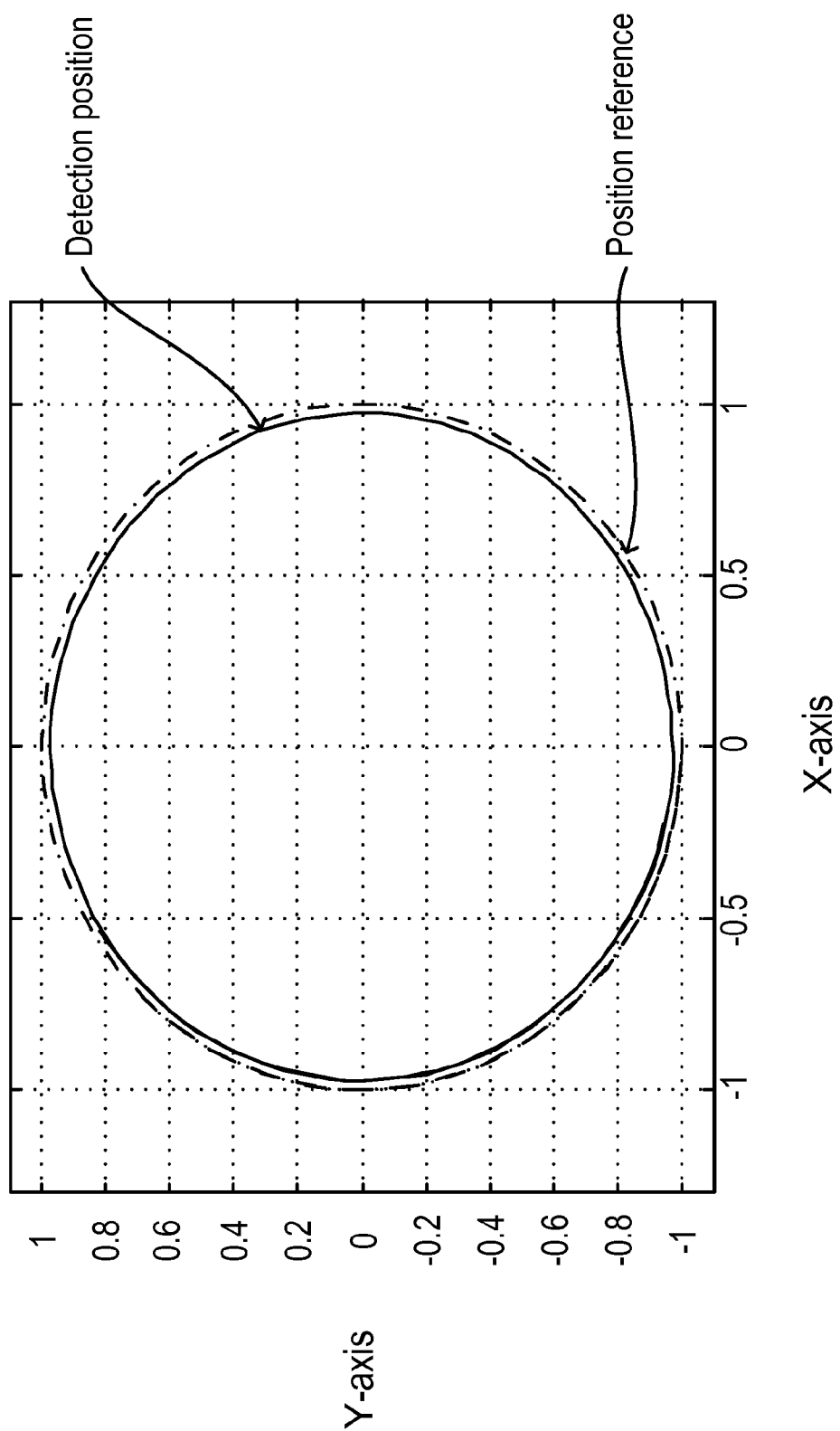
FIG. 14 is a diagram of waveform of an arc interpolation operation when a gain is set in the sixth embodiment of the present invention.

FIG. 13 is a diagram of waveform of an arc interpolation operation when a normal gain is set in the sixth embodiment of the present invention. FIG. 14 is a diagram of waveform of an arc interpolation operation when a gain is set in the sixth embodiment of the present invention. Each of the diagrams plots position command and detection position information when a position command of a sin function is input in the X-axis direction and a position command of a cos function is input in the Y-axis direction. The horizontal axis is the X-axis, the vertical axis is the Y-axis, the solid line shows detection position information, and the chain line shows a position command.

When gain setting values obtained from the equations (16) to (18) are used, it can be found from FIG. 14 that the distortion (elliptic circle which is long in the X-axis direction) of the locus shown in FIG. 13 is improved, and the detection position information follows the position command.

Next, a seventh embodiment of the present invention will be described with reference to the drawings. When detection delays of the detection position information 131 and 141 with respect to a new position command signal 125 in FIG. 1 is as small as about several ms, if the gain setting values obtained from the equations (10) and (11) are used, a distortion of the locus shown in FIG. 11 is improved and the detection position information follows the position command as shown in FIG. 12 of the fifth embodiment.

However, when the detection delays of the detection position information 131 and 141 with respect to the new position command in FIG. 1 is as large as about ten ms, the detection position information is largely distorted. In the case of the position proportion and velocity integration proportion control system in the Y-axis of the single axis drive in the fifth embodiment, the detection delay of the detection position information is generated only in the position command, but in the case of the position integration proportion and velocity proportion control system in the X-axis of the twin drive, the delay is generated in the position command signal 125 and the detection position information 131 and 141. Therefore, the detection delay of the detection position information is increased, and the error of the transfer function in the control loop becomes conspicuous.

Figure 15:
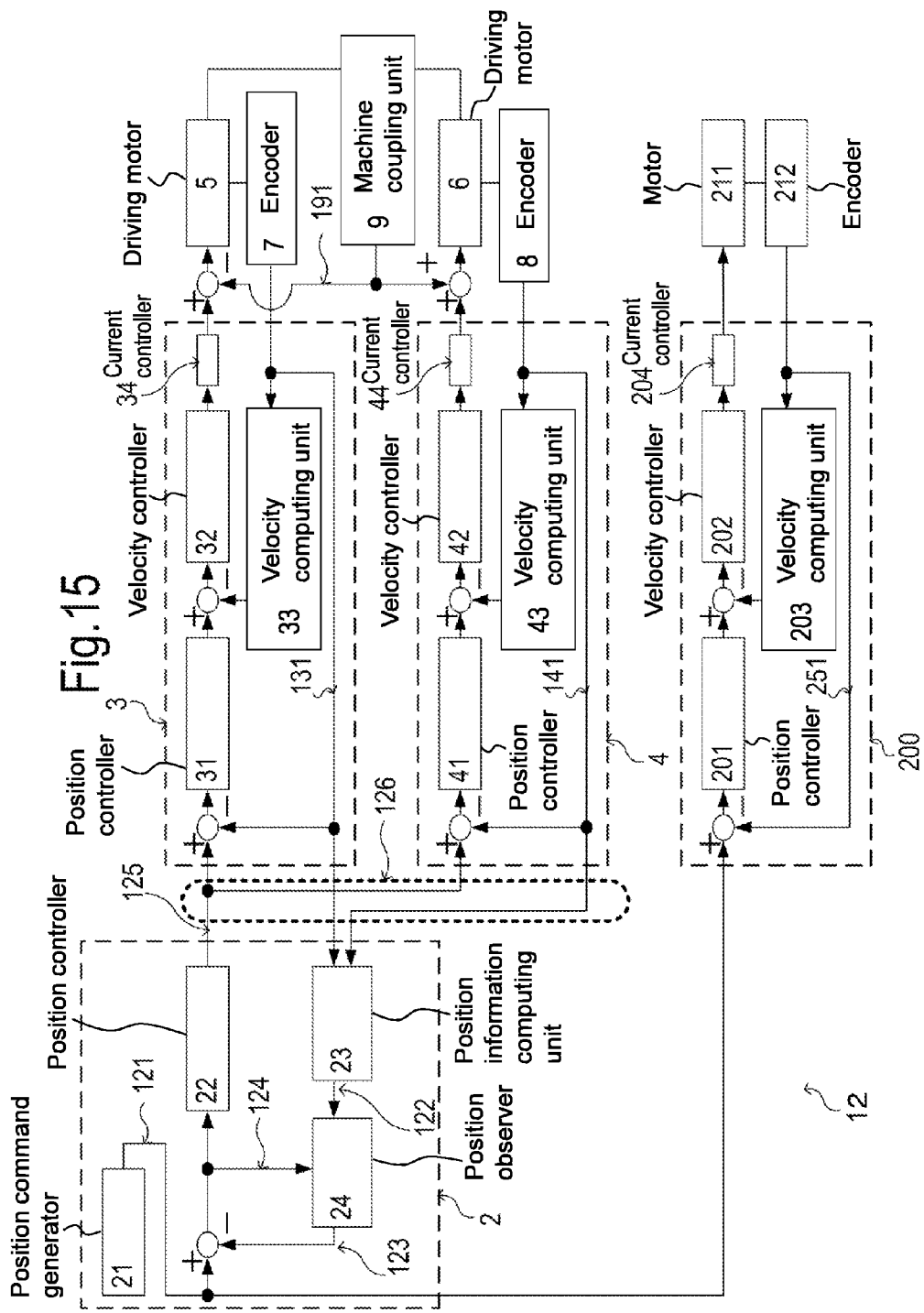
FIG. 15 is a block diagram of asynchronous control apparatus according to a seventh embodiment of the present invention.
Figure 16:
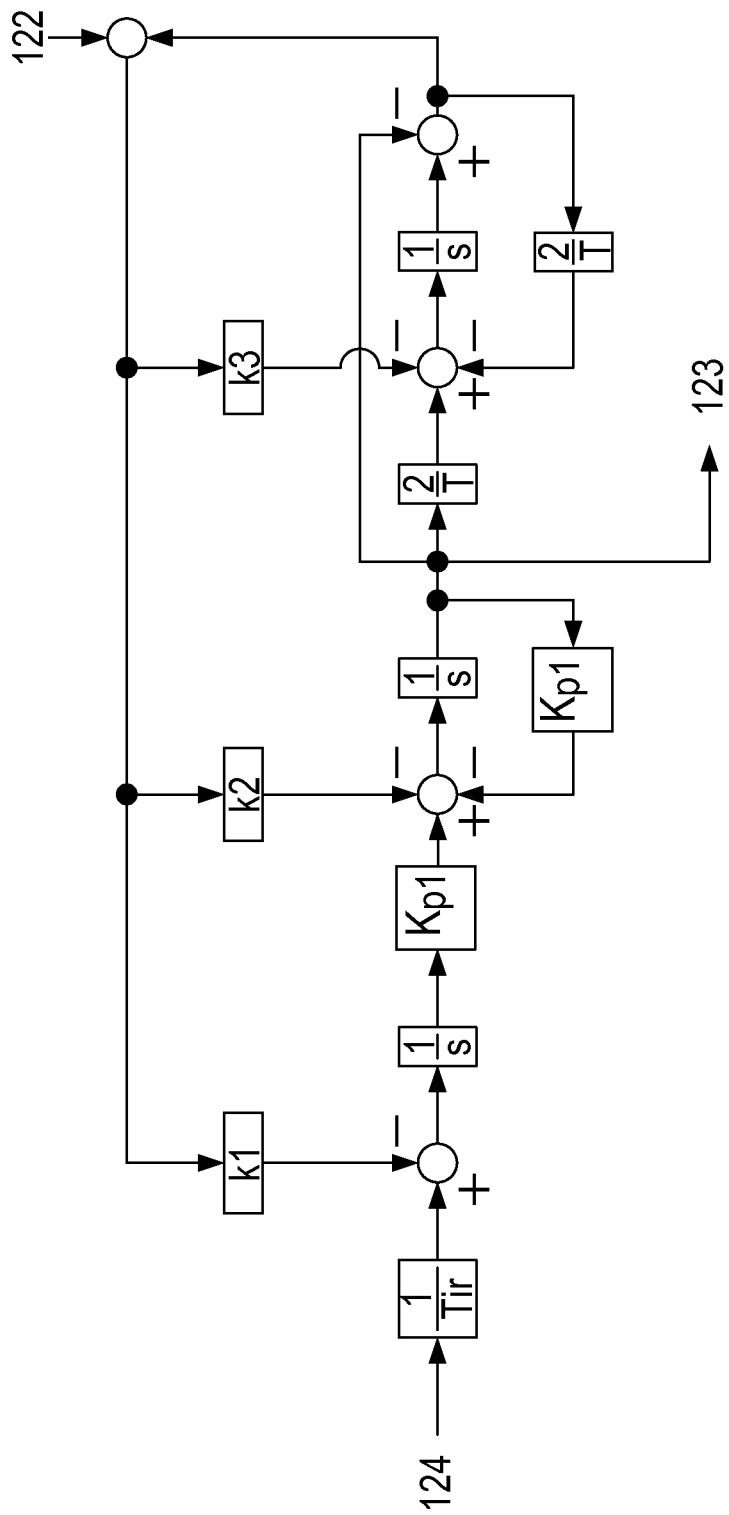
FIG. 16 is a control block diagram of a position observer of the seventh embodiment of the present invention.
Figure 17:
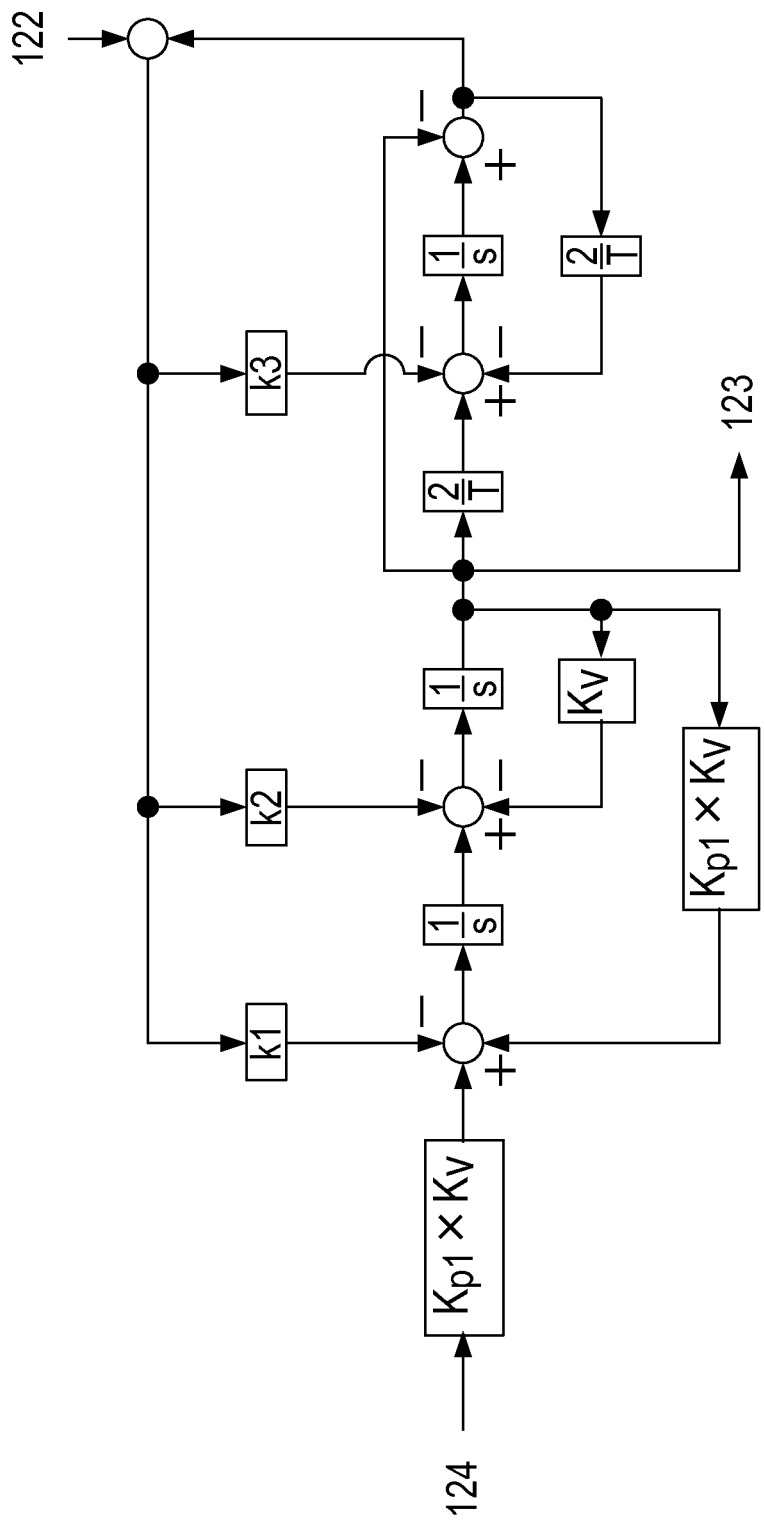
FIG. 17 is another control block diagram of the position observer of the seventh embodiment of the present invention.
Figure 18:
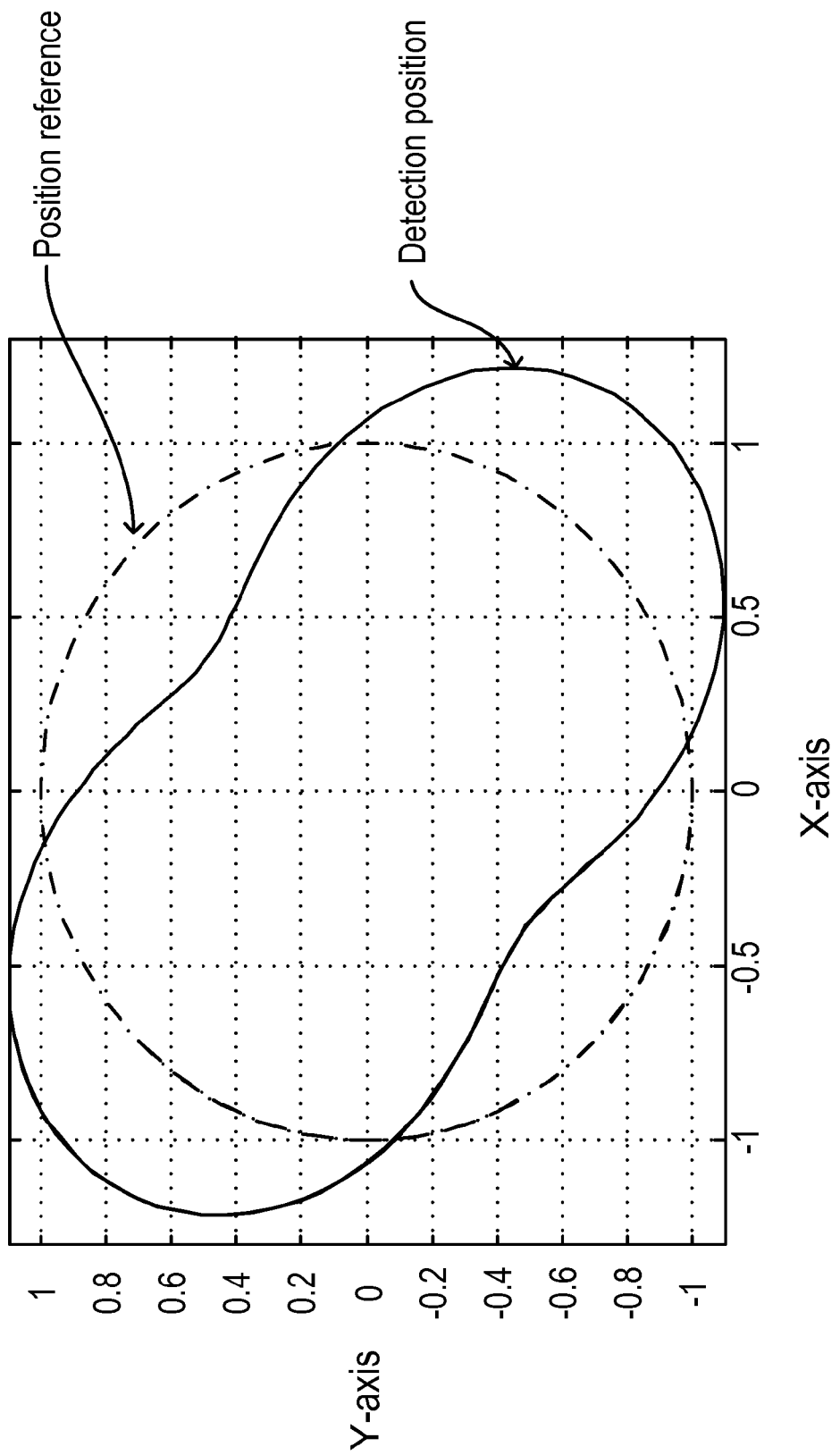
FIG. 18 is a diagram of waveform of an arc interpolation operation when a gain is set in the fifth embodiment of the present invention when delay is long.
Figure 19:
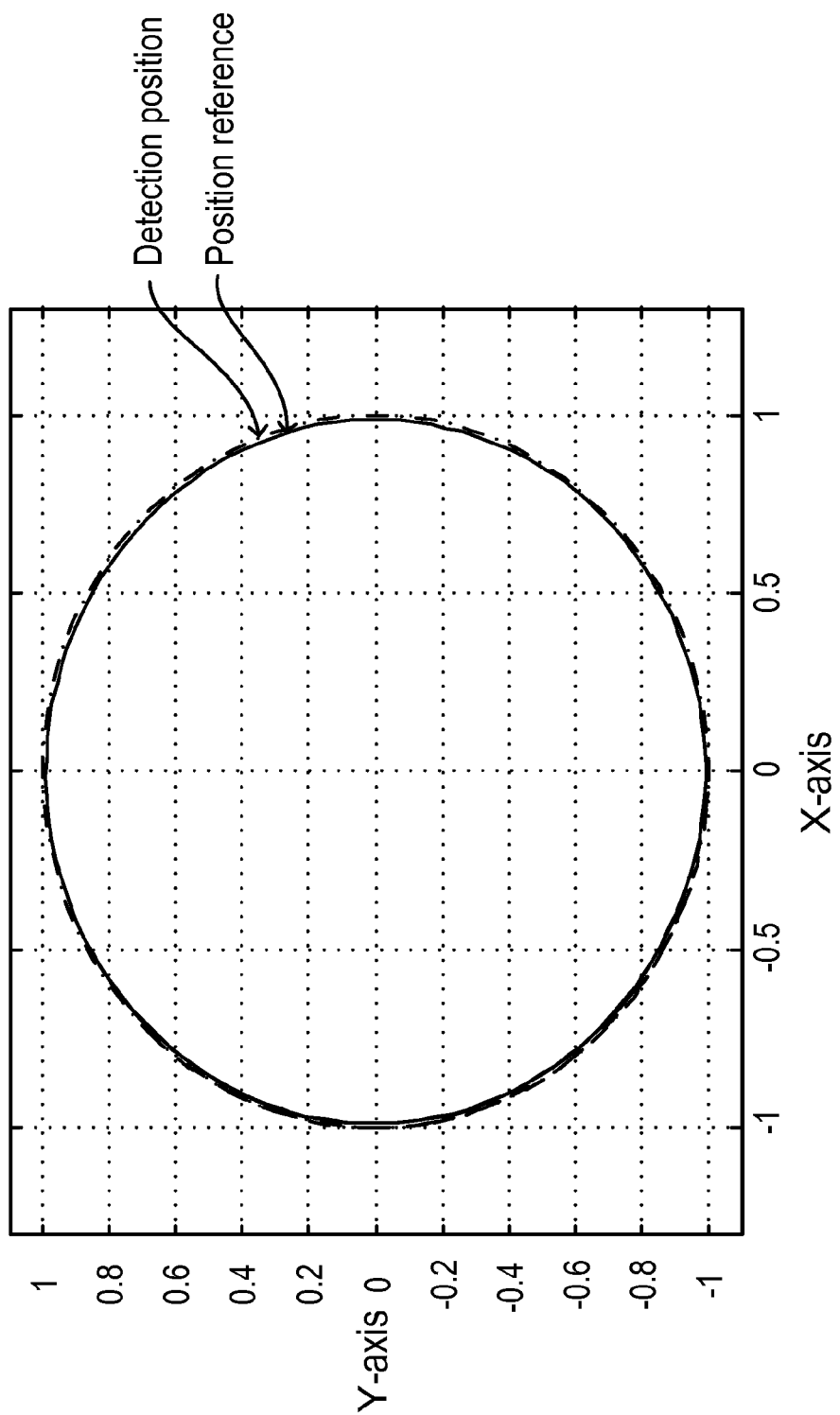
FIG. 19 is a diagram of waveform of an arc interpolation operation when a gain is set in the seventh embodiment of the present invention.

FIG. 15 is a block diagram of the synchronous control apparatus according to the seventh embodiment of the present invention. FIG. 16 is a control block diagram of a position observer of the seventh embodiment of the present invention. FIG. 17 is another control block diagram of the position observer of the seventh embodiment of the present invention. FIG. 18 is a diagram of waveform of an arc interpolation operation when a gain is set in the fifth embodiment of the present invention when delay is long. FIG. 19 is a diagram of waveform of an arc interpolation operation according to the seventh embodiment of the present invention.

A configuration of the synchronous control apparatus 12 in FIG. 15 is different from the synchronous control apparatus 1 shown in FIG. 1 in that configurations of a servo amplifier, a motor 211 and an encoder 212 of a Y-axis of a single axis drive are added to the servo amplifiers 3 and 4 of the X-axis of the twin drive, and in that a configuration of a position observer 24 in the command device 2 is added. The servo amplifier 200 includes a position controller 201, a velocity controller 202, a velocity computing unit 203, and a current controller 204. The configuration (a position controller 201, a velocity controller 202, a velocity computing unit 203, and a current controller 204) has the same effects as the configurations of the servo amplifiers 3 and 4 (the position controllers 31 and 41, the velocity controllers 32 and 42, the velocity computing units 33 and 43, and the current controllers 34 and 44). Constituent elements having the same symbols as those of FIG. 1 have the same operation and effects and thus, detailed description thereof is omitted.

It is possible to avoid the problem that the detection delay of the detection position information is increased by inputting the position deviation 124 and the work position information 122, and by forming the position observer 24 which outputs a new detection position information 123 in which the delay is compensated. This position observer 24 can be configured as shown in FIGS. 16 and 17. FIG. 19 is a waveform diagram of the arc interpolation operation in this case, and it can be found that the distortion of the locus shown in FIG. 18 is improved and the detection position information follows the position command.

Even in the sixth embodiment, the position observer 24 exhibits the same operation and effect. In the fifth to seventh embodiments, it is described that the X-axis is a machine tool having a gantry mechanism which is the twin drive, but the same operation and effect can be obtained even if a movable table has three or more, i.e., a plurality of axes drive as the X-axis as in wide and extra-large machineries.

Especially, the position deviation 124 and the work position information 122 in which detection position information of a plurality of axes are computed by the position information computing unit 23 are input to the position observer 24 of the seventh embodiment, the work position information 122 is computed and output and thus, there is an effect that it is unnecessary to change the design even if the twin axis is changed to the plurality of axes. Even if feedback is carried out using the laser interferometer shown in the second embodiment (FIG. 5) of the present invention, the same operation and effect can be exhibited.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A synchronous control apparatus to synchronously control a plurality of motors with respect to a control subject, comprising:
   a command device comprising:
      a first position controller which is configured to compute a work position based on a plurality of position information detected by a plurality of position detectors and which is configured to compute, based on a difference between a position command and the work position, a new position command, the plurality of position detectors being included in the control subject and configured to detect the plurality of position information of the plurality of motors respectively, the control subject including the plurality of motors and at least one coupler connecting movable axes of the plurality of motors; and
   a plurality of motor control devices each comprising:
      a second position controller configured to compute commands to drive the plurality of motors based on a difference between the new position command and the plurality of position information,
   wherein the control subject is a gantry mechanism including two motors as the plurality of motors, and
   wherein when the work position is expressed by an XY-axes coordinate system, the first position controller in the command device is configured to perform proportion integration control with respect to a difference between the position command and one of axis coordinate system positions of the work position, and when a distance between the movable axes of the two motors is defined as 1, a value obtained by multiplying a ratio in the distance between the axes by one of the plurality of position information, and a value obtained by multiplying a remaining ratio by another position information among the plurality of position information are added to each other, thereby computing the one of the axis coordinate system positions of the work position.

2. A synchronous control apparatus to synchronously control a plurality of motors with respect to a control subject, comprising:
   a command device comprising:
      a first position controller which is configured to compute a work position based on a plurality of position information detected by a plurality of position detectors and which is configured to compute, based on a difference between a position command and the work position, a new position command, the plurality of position detectors being included in the control subject and configured to detect the plurality of position information of the plurality of motors respectively, the control subject including the plurality of motors and at least one coupler connecting movable axes of the plurality of motors; and
   a plurality of motor control devices each comprising:
      a second position controller configured to compute commands to drive the plurality of motors based on a difference between the new position command and the plurality of position information,
   wherein the control subject is an arc locus mechanism, and
   wherein when the work position is expressed by an angle of the machine coupler, the first position controller in the command device is configured to perform proportion integration control with respect to the difference between the position command and the work position, all of the plurality of position information is averaged and computed to compute the work position.

3. A synchronous control apparatus to synchronously control two motors with respect to a control subject which is a gantry mechanism, comprising:
   a position measuring device configured to measure one of axis coordinate system positions of a work position which is expressed by an XY-axes coordinate system;
   a command device comprising:
      a first position controller configured to compute, based on a difference between a position command and a work position information according to the one of axis coordinate system positions of the work position measured by the position measuring device, a new position command;
   first and second motor control devices each comprising:
      a second position controller configured to compute a command to drive the two motors based on a difference between the new position command and two position information detected by two position detectors, the two position detectors being included in the control subject and configured to detect the two position information of the two motors respectively, the control subject including the two motors and a coupler connecting movable axes of the two motors; and
   a third motor control device which has a same function as a function of the first or second motor control device, and to which one of the axis coordinate system positions of the work position is input to output the one of the axis coordinate system positions of the work position to the command device.

4. The synchronous control apparatus according to claim 3, wherein the first position controller in the command device comprises
   a third position control section configured to perform proportion integration control with respect to a difference between the position command and the work position information, and
   a third position information computing section to which the one of the axis coordinate system positions of the work position is input to compute the work position information.

5. The synchronous control apparatus according to claim 3, wherein the second position controller in each of the first and second motor control devices comprises
   a fourth position control section configured to perform proportion control with respect to the difference between the new position command and the two position information to compute a velocity command,
   a fourth velocity computing section to which the two position information is input to compute velocity information, and
   a fourth velocity control section configured to perform proportion control with respect to a difference between the velocity command and the velocity information.

6. The synchronous control apparatus according to claim 3, wherein the second position controller in each of the first and second motor control devices comprises
   a fifth position control section configured to perform proportion control with respect to the difference between the new position command and the two position information to compute a velocity command,
   a fifth velocity computing section to which the two position information is input to compute velocity information, and
   a fifth velocity control section configured to perform proportion control and imperfect integration control with respect to a difference between the velocity command and the velocity information.

7. A synchronous control apparatus comprising:
a first axis to drive a control subject comprising:
   a plurality of first motors;
   a plurality of position detectors configured to detect a plurality of position information of the plurality of first motors respectively; and
   at least one machine coupler connecting movable axes of the plurality of first motors;
a second axis to drive another control subject comprising:
   a second motor;
   a position detector configured to detect position information of the second motor; and
   a machine connector to connect a movable axis of the second motor; and
a command device configured to make the first axis and the second axis carry out an arc interpolation operation of an XY-axes coordinate system based on a position command,
wherein the first axis configures a position integration proportion and velocity proportion control system, and the second axis configures a position proportion and velocity integration proportion control system,
wherein a first position proportion gain in the first axis is set such that the first position proportion gain matches with a reciprocal of velocity integration time in the second axis, and
wherein a position integration time in the first axis is set such that the position integration time matches with a reciprocal of a second position proportion gain in the second axis.

8. The synchronous control apparatus according to claim 7, wherein the first axis configures a position proportion integration and velocity proportion control system in place of the position integration proportion and velocity proportion control system, and the second axis configures a position proportion and velocity proportion integration control system in place of the position proportion and velocity integration proportion control system,
wherein the first position proportion gain in the first axis is set such that the first position proportion gain matches with a sum of ½ of the reciprocal of the velocity integration time in the second axis and ½ of the second position proportion gain in the second axis,
wherein the position integration time in the first axis is set such that the position integration time matches with a sum of ½ of the reciprocal of the second position proportion gain in the second axis and ½ of the velocity integration time in the second axis, and
wherein the velocity integration time in the second axis is set such that the velocity integration time matches with reciprocal of the second position proportion gain in the second axis.

9. The synchronous control apparatus according to claim 8, wherein the command device comprises
a position information computing section to which the plurality of position information detected by the plurality of position detectors is input, and which is configured to compute and output a work position information,
a position observer to which the work position information and position deviation are input, and which is configured to compute and output new work position information, and
a subtracter configured to subtract the new work position information from the position command, and configured to output the position deviation, and
wherein the first axis and the second axis carry out the arc interpolation operation of the XY-axes coordinate system based on the position deviation.

10. The synchronous control apparatus according to claim 7, wherein the command device comprises
a position information computing section to which the plurality of position information detected by the plurality of position detectors is input, and which is configured to compute and output a work position information,
a position observer to which the work position information and position deviation are input, and which is configured to compute and output new work position information, and
a subtracter configured to subtract the new work position information from the position command, and configured to output the position deviation, and
wherein the first axis and the second axis carry out the arc interpolation operation of the XY-axes coordinate system based on the position deviation.

* * * * *